(12) United States Patent
Liu et al.

(10) Patent No.: US 11,916,975 B2
(45) Date of Patent: Feb. 27, 2024

(54) AGGREGATING ELECTRONIC MESSAGES FOR MEETINGS

(71) Applicant: Citrix Systems, Inc., Fort Lauderdale, FL (US)

(72) Inventors: Xuan Liu, Nanjing (CN); Chunhui Wu, Nanjing (CN); Wenshuang Zhang, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/664,297

(22) Filed: May 20, 2022

(65) Prior Publication Data

US 2023/0344877 A1 Oct. 26, 2023

Related U.S. Application Data

(63) Continuation of application No. PCT/CN2022/089212, filed on Apr. 26, 2022.

(51) Int. Cl.
*H04L 65/1069* (2022.01)
*H04L 65/403* (2022.01)

(52) U.S. Cl.
CPC ........ *H04L 65/1069* (2013.01); *H04L 65/403* (2013.01)

(58) Field of Classification Search
CPC .......................... H04L 65/1069; H04L 65/403
See application file for complete search history.

(56) References Cited

U.S. PATENT DOCUMENTS

| 10,817,782 | B1 | 10/2020 | Rando |
| 11,457,057 | B2 * | 9/2022 | Pathak ................. H04L 65/403 |
| 2003/0222765 | A1 | 5/2003 | Curbow |
| 2005/0216328 | A1 | 9/2005 | Clark |
| 2007/0244879 | A1 | 10/2007 | Clausner |

(Continued)

FOREIGN PATENT DOCUMENTS

| CN | 101155049 A | 4/2008 |
| CN | 102385615 A | 3/2012 |

(Continued)

OTHER PUBLICATIONS

International Search Report and Written Opinion issued in App. No. PCT/CN2021/136316, dated Sep. 14, 2022, 10 pages.

(Continued)

*Primary Examiner* — Kristie D Shingles

(57) ABSTRACT

In some embodiments, a method can include: receiving, by a computing device, a plurality of messages, where at least a first one of the plurality of messages is associated with a first application and at least a second one of the plurality of messages is associated with a second application different from the first; receiving, by the computing device, information about one or more scheduled meetings; determining, by the computing device, one or more of the plurality of messages that are associated with a first meeting of the one or more scheduled meetings; and sending, by the computing device, information about the associations of the one or more of the plurality of messages and the first meeting to another computing device to enable the another computing device to display a list of the one or more of the plurality of messages in conjunction with the first meeting.

12 Claims, 16 Drawing Sheets

(56) References Cited

U.S. PATENT DOCUMENTS

| | | |
|---|---|---|
| 2008/0313004 A1 | 12/2008 | Ryan |
| 2013/0097491 A1 | 4/2013 | Shoya |
| 2014/0222907 A1* | 8/2014 | Seligmann ............ H04L 65/103 709/204 |
| 2015/0142800 A1 | 5/2015 | Thapliyal |
| 2015/0169788 A1 | 6/2015 | Doganata |
| 2015/0220888 A1 | 8/2015 | Iyer |
| 2016/0329050 A1 | 11/2016 | Godewyn |
| 2017/0126755 A1* | 5/2017 | Singh ...................... H04L 67/06 |
| 2017/0278038 A1 | 9/2017 | Wu |
| 2018/0018610 A1 | 1/2018 | Del Balso |
| 2018/0287987 A1 | 10/2018 | Purian |
| 2019/0258985 A1 | 8/2019 | Guastella |
| 2020/0145240 A1 | 5/2020 | Jaber |
| 2020/0257850 A1 | 8/2020 | Carbune |
| 2021/0019713 A1 | 1/2021 | Vangala |
| 2021/0073712 A1 | 3/2021 | Fox |
| 2021/0109744 A1 | 4/2021 | Hegde |
| 2021/0400142 A1* | 12/2021 | Jorasch .............. H04N 21/4781 |
| 2022/0329555 A1 | 10/2022 | Xu |

FOREIGN PATENT DOCUMENTS

| | | |
|---|---|---|
| CN | 102685130 A | 9/2012 |
| CN | 102685227 A | 9/2012 |
| CN | 103186847 A | 7/2013 |
| CN | 103327087 A | 9/2013 |
| CN | 108027738 A | 5/2018 |
| CN | 108391079 A | 8/2018 |
| CN | 109074555 A | 12/2018 |
| CN | 111125086 A | 5/2020 |
| WO | 2013095755 A2 | 6/2013 |

OTHER PUBLICATIONS

International Search Report and Written Opinion issued in App. No. PCT/CN2021/136681, dated Sep. 7, 2022, 9 pages.
International Search Report and Written Opinion issued in App. No. PCT/CN2021/136954, dated Aug. 25, 2022, 9 pages.
International Search Report and Written Opinion issued in App. No. PCT/CN2021/118120, dated Jun. 10, 2022, 9 pages.
International Search Report and Written Opinion issued in App. No. PCT/CN2022/070451, dated Oct. 10, 2022, 10 pages.
International Search Report and Written Opinion for App. No. PCT/CN2021/085878, dated Jan. 4, 2022, 10 pages.
Non-Final Office Action dated Apr. 30, 2021 for U.S. Appl. No. 17/245,546.

* cited by examiner

1500

Receive information about associations between a plurality of messages and a meeting, at least two different messages associated with two different applications
1502

Present a user interface (UI) for displaying a list of the messages in conjunction with the meeting
1504

AGGREGATING ELECTRONIC MESSAGES FOR MEETINGS

CROSS REFERENCE TO RELATED APPLICATIONS

This application is a continuation of and claims the benefit of PCT Patent Application No. PCT/CN2022/089212 filed on Apr. 26, 2022 in the English language in the State Intellectual Property Office and designating the United States, the contents of which are hereby incorporated herein by reference in its entirety.

BACKGROUND

Organizations schedule meetings for a variety of reasons. For example, within a company, employees within the same division may invited to and/or required to attend monthly planning meetings, weekly "check in" meetings, etc. In addition to regularly scheduled meetings, employees or other persons associated with an organization ("users") may be invited to stand-alone meetings to discuss time-sensitive matters. It is not uncommon for an employee to attend several meetings in the same day.

Online or "virtual" meetings are an increasingly popular way for companies and other types of organizations to collaborate, particularly when their users are in different physical locations. Online meeting services (or "meeting services" for short) such as TEAMS, ZOOM, and GOTOMEETING provide audio and video conferencing among other features.

To schedule a meeting, a user ("organizer") may send an invitation to one or more other users ("attendees") using a calendaring application, such as OUTLOOK. The meeting invitation may include a description of the meeting, the date and time the meeting is scheduled for, and, in the case of an online meeting, a link to join the online meeting. In some cases, the organizer may also attach an agenda to the meeting invitation.

SUMMARY

Prior to a scheduled meeting, an attendee may receive one or more electronic messages (or "messages") that are related to the meeting. Such messages may be received from the meeting organizer and/or from other scheduled attendees. For example, a user may receive a message (e.g., an email, directly chat message, group chat message, etc.) noting that a particular issue will be during the meeting, or a message asking the user to present on a certain topic during the meeting. Such messages may include additional information not included within the meeting invitation or amended attached thereto, and may be received from multiple different applications, such as OUTLOOK, SLACK, TEAMS, ZOOM, JIRA, WRIKE, etc. Thus, to fully prepare for a meeting, it may be necessary for an attendee to manually compile the additional information over time as the messages are received, or to search/scan through a large number of messages across multiple different applications to access the messages prior to the start of the meeting. Both approaches are inefficient in terms of user productivity and/or consumed computing resources.

Disclosed embodiments allow for the convenient and timely access to an aggregated list of messages that are associated with a meeting the user is scheduled to attend, where the messages are associated with a multiple different applications. Disclosed embodiments automatically retrieve messages from multiple application services, retrieve scheduled meeting information from a calendar service, and use pattern matching to automatically associate messages with meetings. Disclosed embodiments can aggregate a list of messages associated with a particular meeting, and present the list of messages on clients of users scheduled to attend the meeting. Disclosed embodiments can push or otherwise present a list of associated messages within a calendar application before a meeting starts and/or provide access to the list of messages within an online meeting application. Disclosed embodiments enable clients to edit message-meeting associations directly within the applications where the messages are sent/received. Disclosed embodiments can provide notifications of new message-meeting associations within an activity feed of a resource access application or other type of application.

According to one aspect of the disclosure, a method can include: receiving, by a computing device, a plurality of messages, where at least a first one of the plurality of messages is associated with a first application and at least a second one of the plurality of messages is associated with a second application different from the first; receiving, by the computing device, information about one or more scheduled meetings; determining, by the computing device, one or more of the plurality of messages that are associated with a first meeting of the one or more scheduled meetings; and sending, by the computing device, information about the associations of the one or more of the plurality of messages and the first meeting to another computing device to enable the another computing device to display a list of the one or more of the plurality of messages in conjunction with the first meeting.

In some embodiments, the determination that the one or more of the plurality of messages are associated with the first meeting can include: identifying a list of candidate messages by matching ones of the plurality of messages against a set of patterns; and for ones of the candidate messages: identifying one or more users associated with the candidate message, comparing the one or more users associated with the candidate message to a set of users scheduled to attend the first meeting, and comparing content of the candidate message against a description of the first meeting.

In some embodiments, the method can further include: responsive to a determination that a first message of the one or more of the plurality of messages is associated with the first meeting, storing information about the association of the first message and the first meeting to a database; and responsive to a determination that a second message of the one or more of the plurality of messages is associated with the first meeting, storing information about the association of the second message and the first meeting to the database, wherein sending the information about the associations of the one or more of the plurality of messages and the first meeting includes querying the database for stored information about associations with the first meeting. In some embodiments, the method can further include: responsive to the determination that the first message of the one or more of the plurality of messages is associated with the first meeting: sending information about the association of the first message and the first meeting to the another computing device to enable the another computing device to edit the association of the first message and the first meeting. In some embodiments, the method can further include: receiving updated information about the association of the first message and the first meeting from the another computing device; and storing the updated information about the association of the first message and the first meeting to the database.

In some embodiments, the another computing device can be one of a plurality of other computing devices associated with users that are scheduled to attend the first meeting, and sending the information about the associations of the one or more of the plurality of messages and the first meeting to the another computing device can include sending the information about the associations of the one or more of the plurality of messages to the plurality of other computing devices.

In some embodiments, another computing device can be one of a plurality of other computing devices associated with users that are scheduled to attend the first meeting, and the method can further include: determining, by the computing device, one or more other ones of the plurality of messages that are associated with the first meeting and with a first user associated with a first one of the plurality of other computing devices, the one or more other ones of the plurality of messages being different from the ones of the plurality of messages; and sending, by the computing device, information about the associations of the one or more other ones of the plurality of messages and the first meeting to the first one of the plurality of other computing devices to enable the first one of the plurality of other computing devices to display a list of the one or more other ones of the plurality of messages in conjunction with the first meeting.

According to one aspect of the disclosure, a method can include: receiving, by a computing device, information about associations between a plurality of messages and a meeting, wherein at least a first one of the plurality of messages is associated with a first application and at least a second one of the plurality of messages is associated with a second application; and presenting, by the computing device, a user interface (UI) for displaying a list of the plurality of messages in conjunction with the meeting.

In some embodiments, the method can further include detecting, by the computing device, that the meeting is scheduled to start at a time less than or equal to a current time plus a reminder period, wherein the UI is presented within a calendar application responsive to the detection. In some embodiments, the method can further include detecting that the computing device has joined the meeting, wherein UI is presented within an application for accessing the meeting responsive to the detection. In some embodiments, the method can further include: receiving, by the computing device, information about an association between a first one of the plurality of messages and the meeting; and presenting, by the computing device, a UI for editing the association between a first one of the plurality of messages and the meeting. In some embodiments, the UI for editing the association between a first one of the plurality of messages and the meeting can include controls for editing a description of the first one of the plurality of messages and for editing a list of users associated with both the first one of the plurality of messages and the meeting. In some embodiments, the method can further include displaying, by the computing device, the information about an association between a first one of the plurality of messages and the meeting within an activity feed.

According to one aspect of the disclosure, a computing device can include a processor and a memory storing computer program code that when executed on the processor causes the processor to execute a process corresponding to any of the aforementioned method embodiments.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Figure 1:
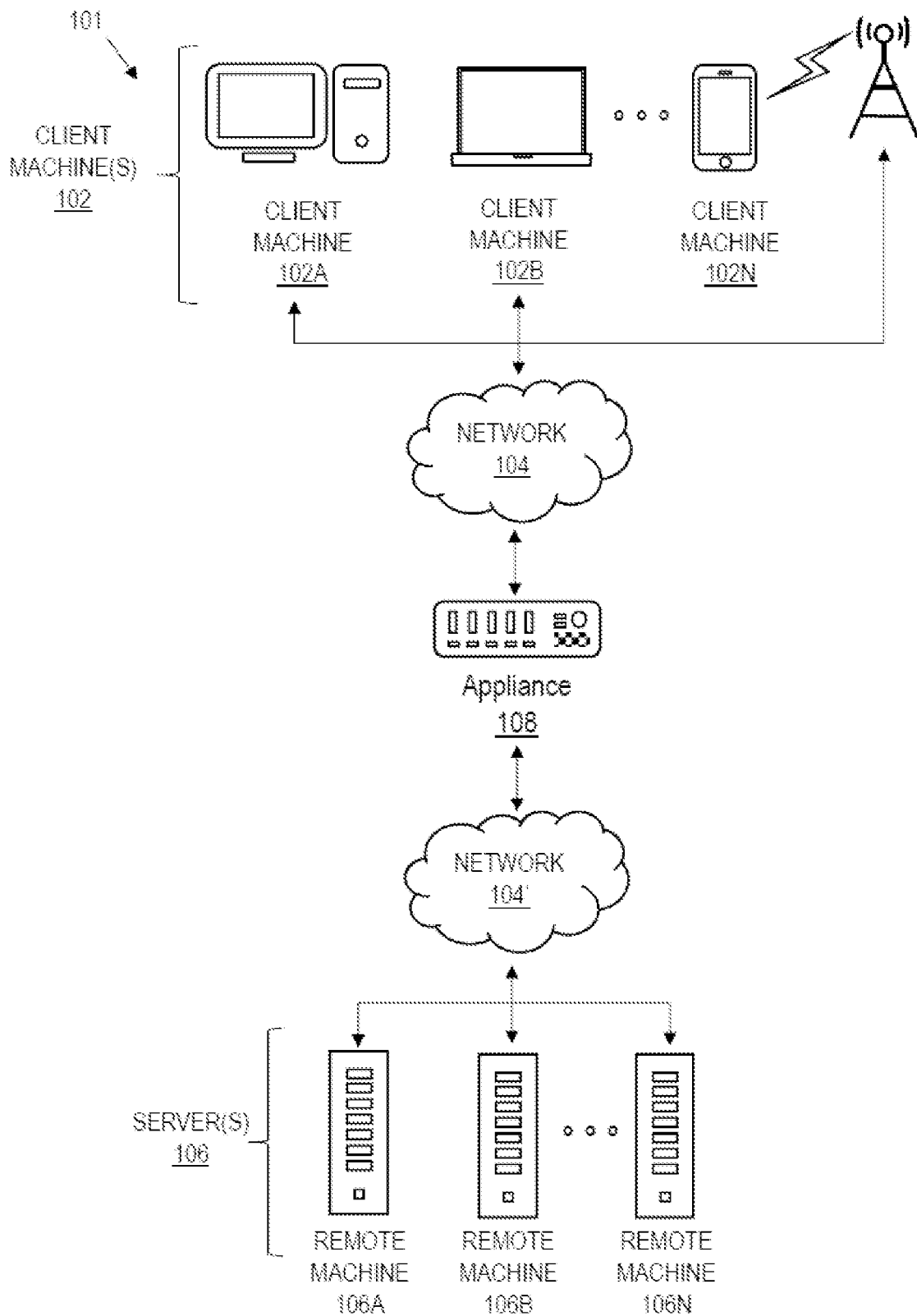
FIG. 1 is a diagram illustrating an example network environment of computing devices in which various aspects of the disclosure may be implemented, in accordance with an embodiment of the present disclosure.

Referring now to FIG. 1, shown is an example network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
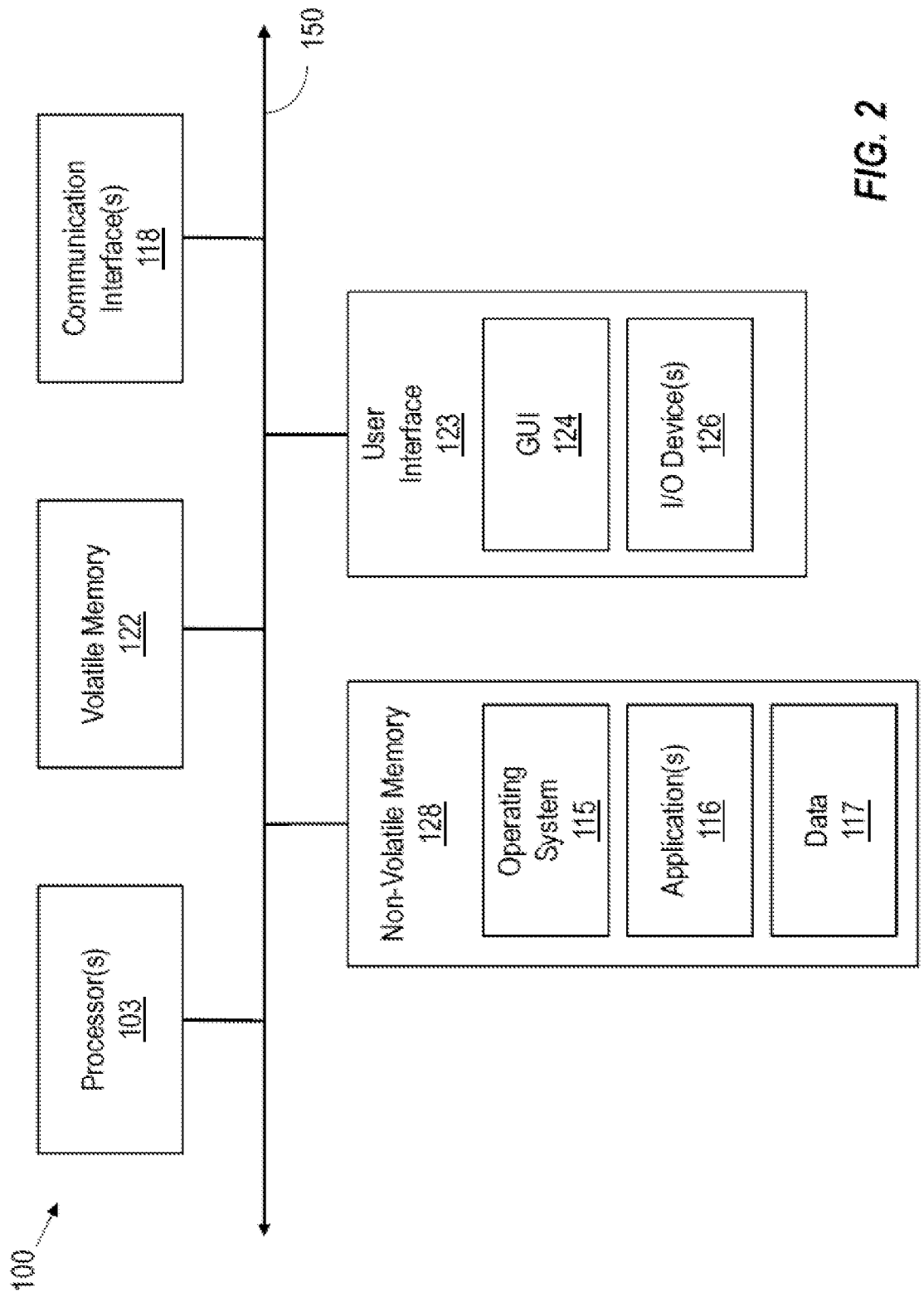
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 100 in which various aspects of the disclosure may be implemented, in accordance with an embodiment of the present disclosure. For instance, client devices 102, appliances 108, and/or servers 106 of FIG. 1 can be substantially similar to computing device 100.

As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an example client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed-signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
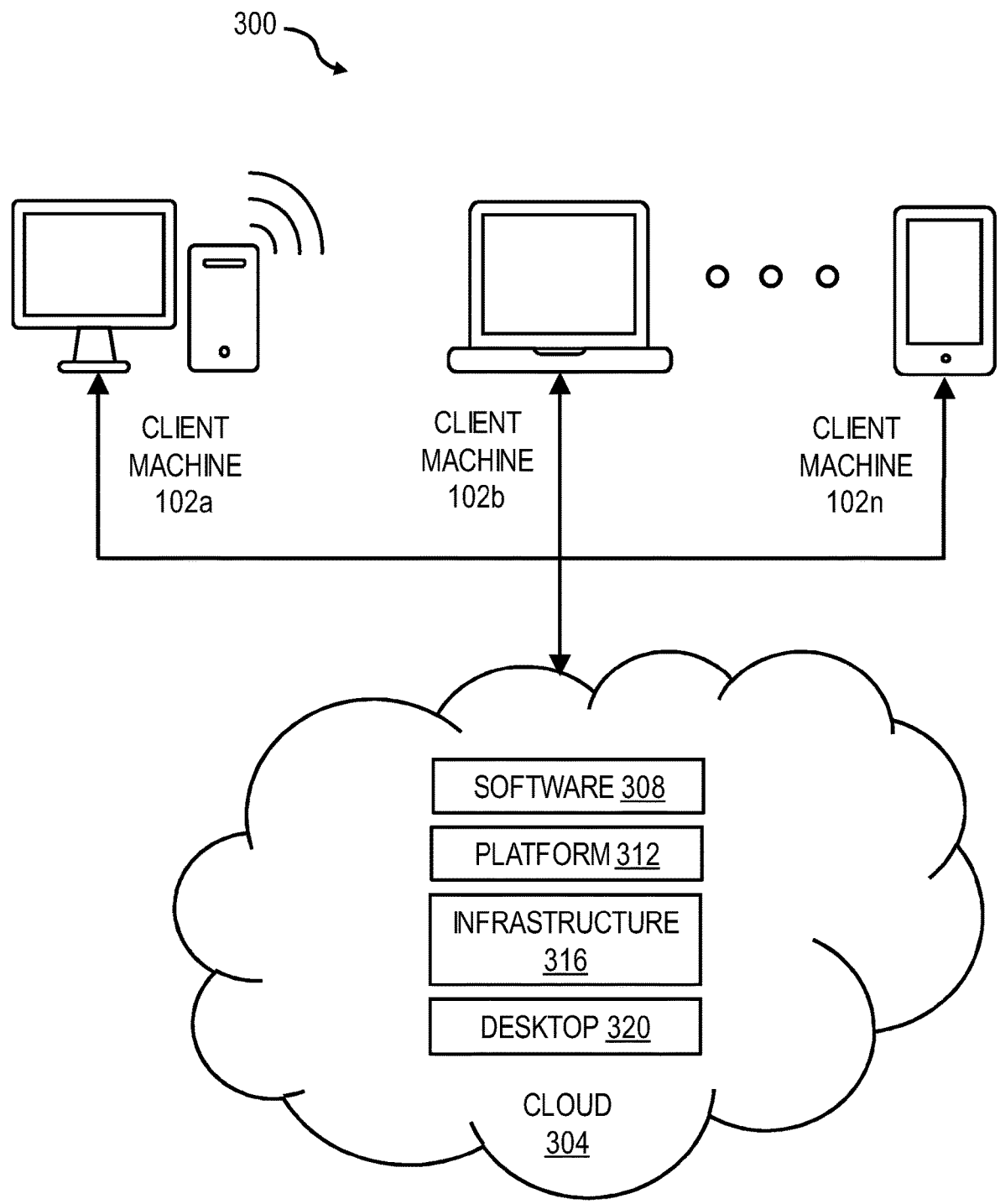
FIG. 3 is a diagram of a cloud computing environment in which various aspects of the concepts described herein may be implemented.

Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 102a-102n (such as those described above) are in communication with a cloud network 304. The cloud network 304 may include back-end platforms, e.g., servers, storage, server farms or data centers. The users or clients 102a-102n can correspond to a single organization/tenant or multiple organizations/tenants. More particularly, in one example implementation the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 102a-102n or the enterprise/tenant. The servers may be located off-site in remote geographical locations or otherwise.

The cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 102. In some embodiments, the cloud computing environment 300 can include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
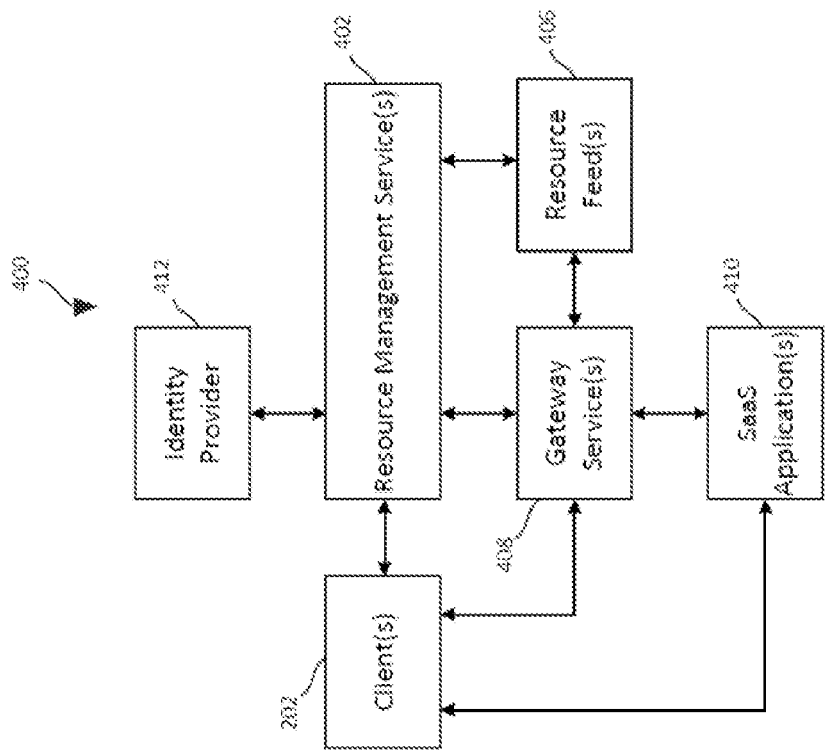
FIG. 4A is a block diagram of an example system in which resource management services may manage and streamline access by clients to resource feeds (via one or more gateway services) and/or software-as-a-service (SaaS) applications.

FIG. 4A is a block diagram of an example system 400 in which one or more resource management services 402 may manage and streamline access by one or more clients 202 to one or more resource feeds 406 (via one or more gateway services 408) and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 4B:
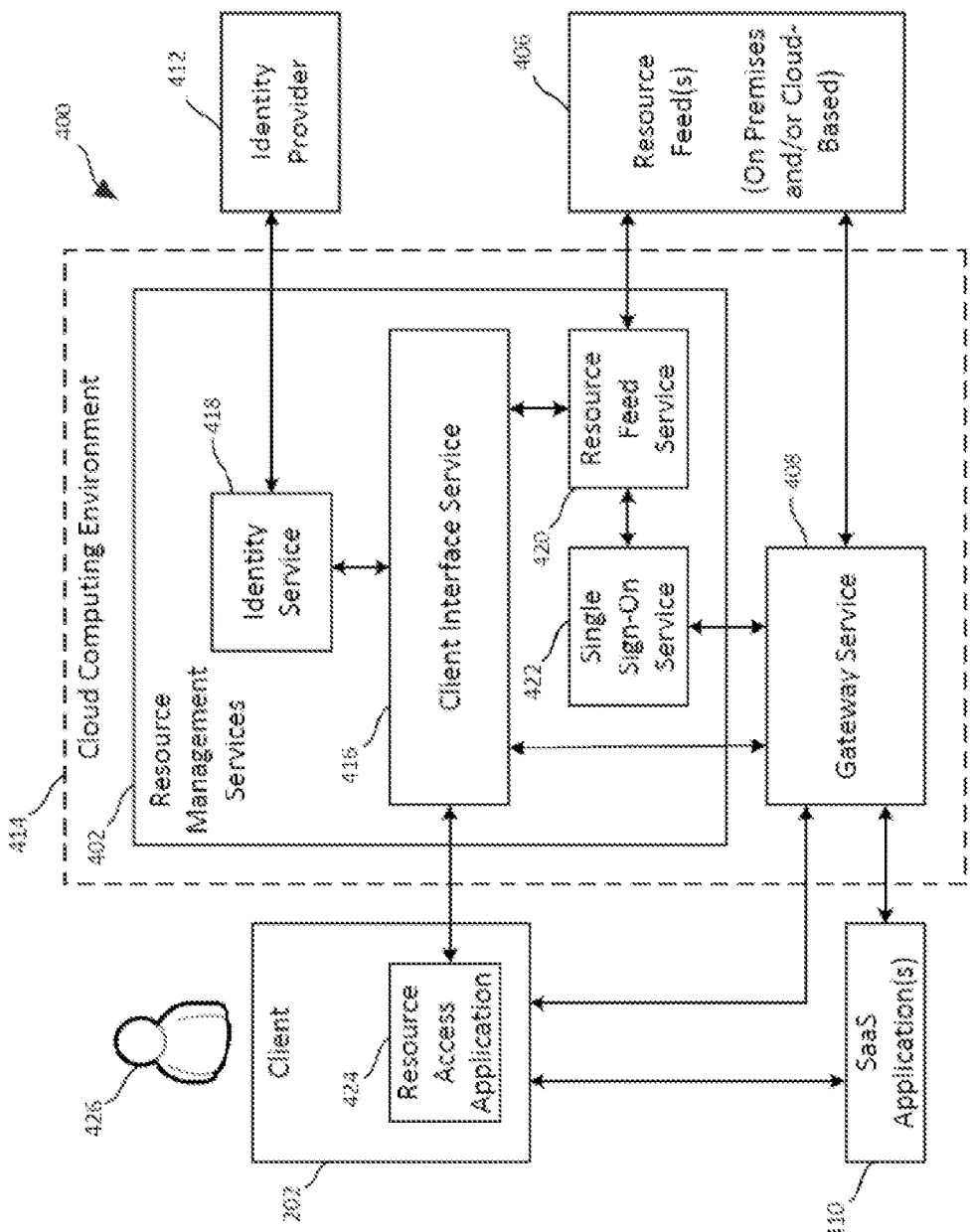
FIG. 4B is a block diagram showing an example implementation of the system shown in FIG. 4A in which various resource management services as well as a gateway service are located within a cloud computing environment.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 4C:
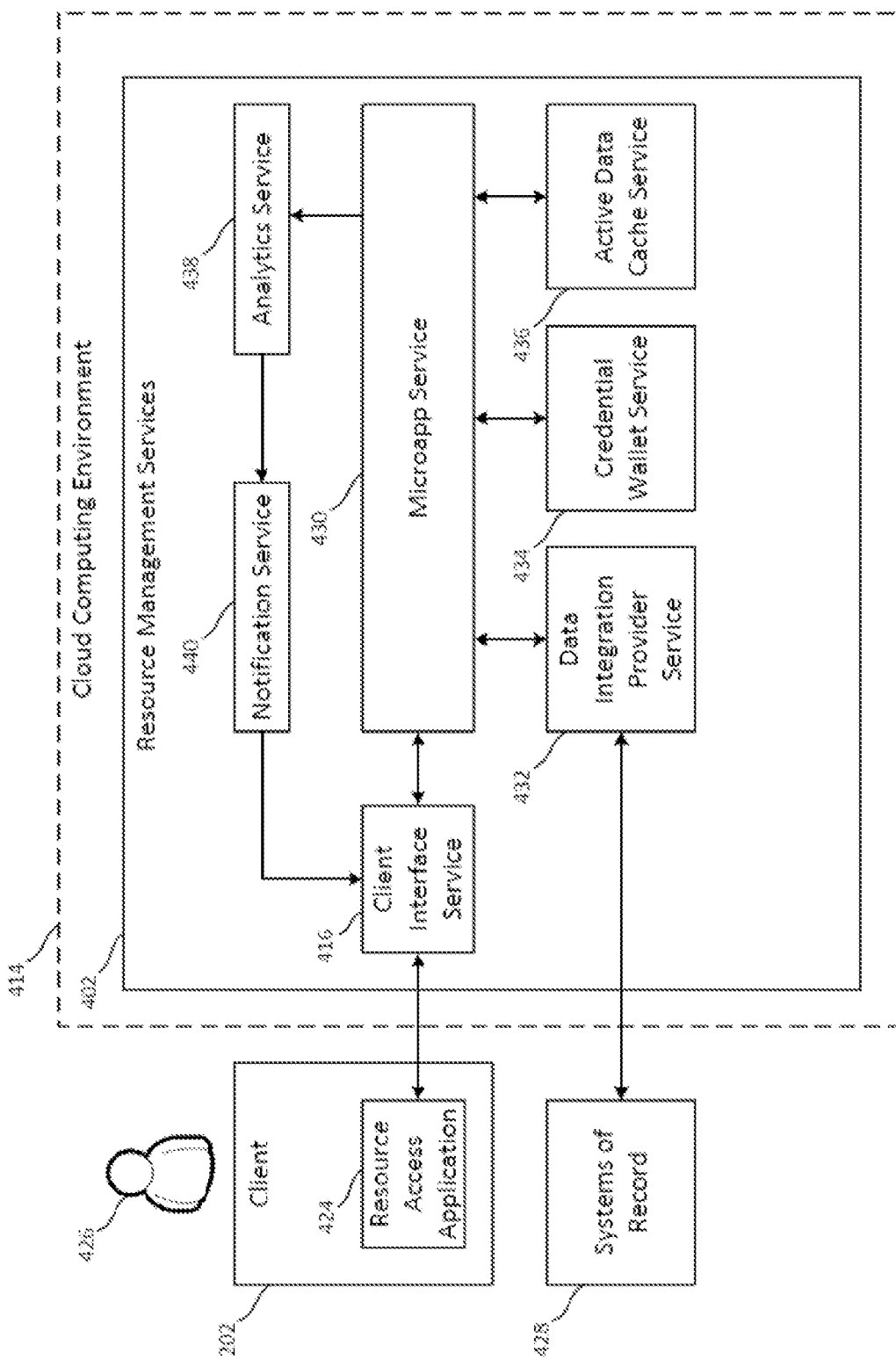
FIG. 4C is a block diagram similar to that shown in FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapps service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in a notification feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in a notification feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Oath2 token. The data integration provider service 432 may then decrypt the Oath2 token and write the action to the appropriate system of record under the identity of the user 426. The data integration provider service 432 may then read back changed data from the written-to system of record and send that changed data to the microapp service 430. The microapp service 432 may then update the active data cache service 436 with the updated data and cause a message to be sent to the resource access application 424 (via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistance through either the resource access application 424 or directly from another resource, such as Microsoft Teams. This feature may allow employees to work efficiently, stay organized, and deliver only the specific information being sought.

Figure 5:
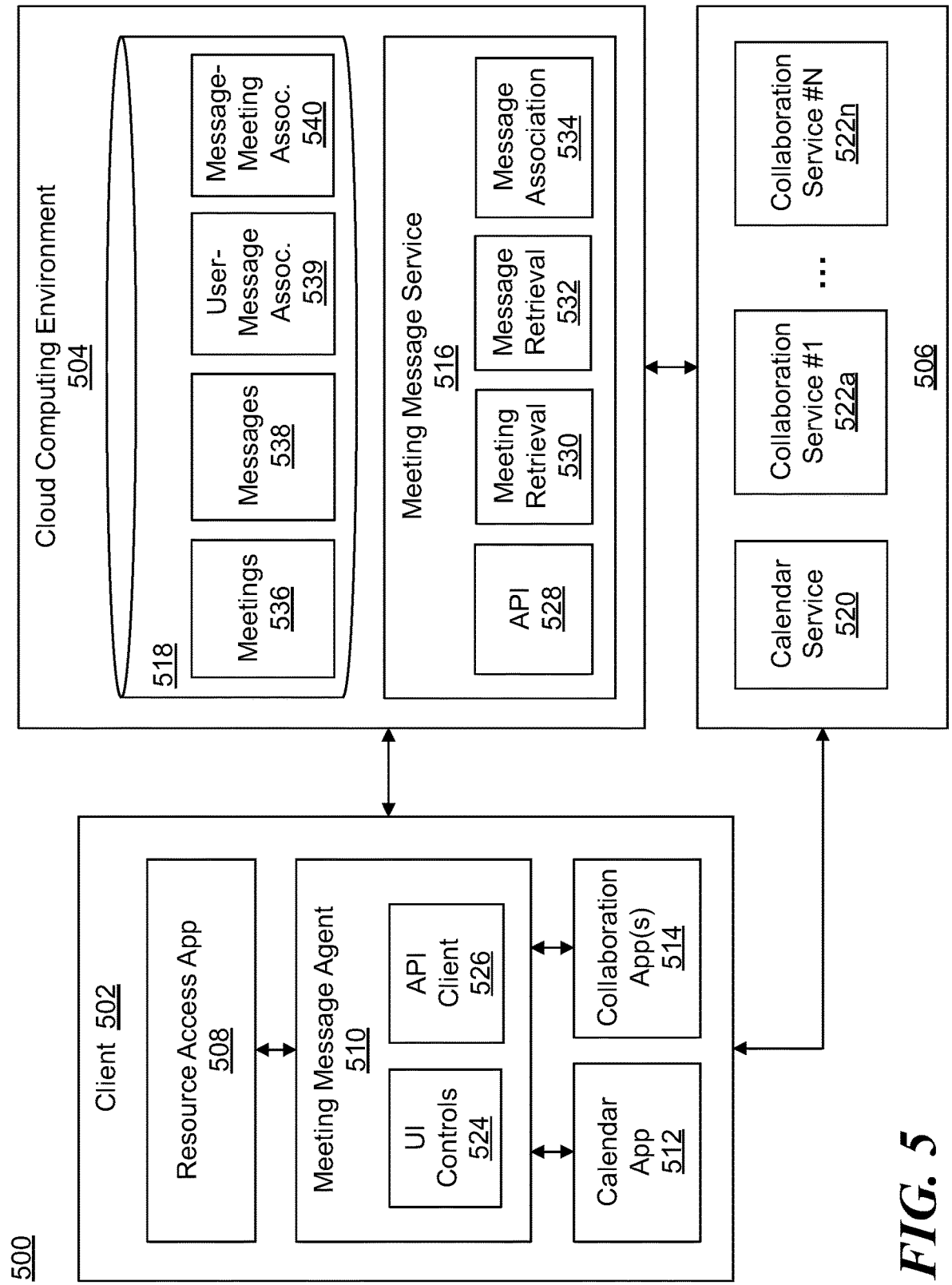
FIG. 5 is block diagram of a system for aggregating meeting messages, according to some embodiments.

FIG. 5 shows a system for automatically retrieving messages from multiple different applications, associating the messages with scheduled meetings, and for generating and presenting aggregated lists of messages associated with particular meetings to meeting attendees, according to some embodiments. Illustrative system 500 includes one or more clients (with only single client 502 shown for clarity), a cloud computing environment 504, and one or more application services 506, which components can be interconnected via one or more computer networks. Client 502 and cloud computing environment 504 can be the same as or similar to client 202 and cloud computing environment 414, respectively, of FIGS. 4A-4C.

Illustrative client 502 can include a resource access application 508, a meeting message agent 510, and one or more other applications such as a calendar application 512 and one or more collaboration applications 514. Applications 508, 512, 514 can include various types of applications such as native desktop/mobile applications, virtual applications, web-based applications, etc. Collaboration applications 514 can generally include any applications capable of sending and receiving messages with other clients. For example, collaboration applications 514 can include OUTLOOK, SLACK, TEAMS, ZOOM, JIRA, WRIKE, and similar types of applications. Calendar application 512 may correspond to a standalone calendar application or to a multi-function application that provides both calendaring and messaging (e.g., email) functionality, such as OUTLOOK. In the latter case, the multi-function application may be considered both a calendar application 512 and a collaboration application 514 for the purpose of this disclosure. Resource access application 508 can be the same as or similar to resource access application 424 of FIGS. 4A-4C. In some embodiments, resource access application 508 may correspond to CITRIX WORKSPACE.

Illustrative cloud computing environment 504 can include a meeting message service 516 and a database 518. In some embodiments, database 518 can correspond to a storage service within cloud computing environment 504. Various types of databases can be used, including but not limited to a relational database, an object database, a NoSQL database, or a file store.

Application services 506 can include a calendar service 520 and one or more collaboration services 522a, . . . , 522n (522 generally). Calendar application 512 can interface with calendar service 520 to schedule meetings and/or to display information about meetings that client 502 is scheduled to attend (in other words, meetings that are to be attended by a user associated with client 502). Calendar service 520 may provide an application programming interface (API) that can be used by meeting message service 516 to retrieve information about scheduled meetings. A particular one of the collaboration applications 514 installed on client 502 can interface with a corresponding one of the collaboration services 522 to enable client 502 to send and receive messages with other clients. One or more of the collaboration services 522 may be a SaaS application, and the corresponding collaboration application 514 may correspond to a web browser or other type of client application configured to access the SaaS application. One or more of the collaboration services 522 may provide an API that can be used by collaboration applications 514 to send and receive messages, and by meeting message service 516 to retrieve messages that may be associated scheduled meetings as discussed in detail below.

Meeting message agent 510 and meeting message service 516 can interoperate to automatically associate messages with scheduled meetings, generate aggregated lists of such messages, and present various more user interfaces (UIs) on client 502 for accessing and editing message-meeting associations and aggregated lists of meeting-associated messages. To promote clarity in the drawings, FIG. 5 shows a single client 502 connected to meeting message service 516. However, in general, meeting message service 516 can interoperate with many clients associated with one or more organizations. Meeting message agent 510 and/or meeting message service 516 may be implemented as computer instructions executable to perform the corresponding functions disclosed herein.

Meeting message agent 510 and meeting message service 516 can be logically and/or physically organized into one or more components. In the example of FIG. 5, meeting message agent 510 includes UI controls 524 and an API client 526. Also, in this example, meeting message service 516 includes an API module 528, a meeting retrieval module 530, a message retrieval module 532, and an association module 534. In some embodiments, meeting message service 516 can be provided as a service (e.g., a microservice) within the cloud clouding environment 504.

Meeting message agent 510 can interface with resource access application 508 and/or one or more of the other applications 512, 514 installed on client 502 to provide access to message-meeting associations and aggregated lists of meeting-associated messages directly within those applications, as discussed further below. In some embodiments, meeting message agent 510 may be implemented, in whole or in part, as a plugin/extension to resource access application 508 and/or to one or more of the other applications 512, 514. In some embodiments, meeting message agent 510 may be configured to run as a standalone application process on client 502, and to interface with applications 508, 512, 514 using inter-process communication (IPC), for example.

The client-side meeting message agent 510 and cloud-side meeting message service 516 can communicate using an API. For example, meeting message agent 510 can utilize API client 526 to send API requests (or "messages") to meeting message service 516 wherein the API requests and received and processed by API module 528. Likewise, meeting message service 516 can utilize API module 528 to send API responses/messages back to meeting message agent 510, wherein the API responses are received and processed by API client 526. Examples of such API requests and responses are discussed below.

Turning to meeting message service 516 within cloud computing environment 504, meeting retrieval module 530 is operable to receive information about scheduled meetings from calendar service 520. For example, meeting retrieval module 530 may utilize an API provided by calendar service 520 to query or otherwise request information about meetings (e.g., meetings that are scheduled to start at a future time) for which one or more particular users are scheduled to attend. In the case where calendar service 520 is EXCHANGE, meeting retrieval module 530 may use a MICROSOFT GRAPH API to access scheduled meeting information.

Meeting retrieval module 530 can retrieve meeting information for a single user (e.g., a user associated with client 502), for multiple users associated with a particular organization, and/or for multiple users associated with multiple different organizations. Meeting retrieval module 530 may obtain, for one or more users, authentication credentials (e.g., user ids and passwords, access tokens, etc.) needed to access meeting information for those users from calendar service 520. In some embodiments, meeting retrieval module 530 may use a single sign-on service (e.g., service 422 of FIG. 4B) to access the calendar service 520.

For a particular meeting, meeting retrieval module 530 may receive some or all of the following information from calendar service 520: (1) a unique identifier for the meeting (or "meeting identifier"), (2) the meeting's title, (3) the date and/or time the meeting is scheduled to start, and (4) a list of the meeting's attendees (e.g., a list of email addresses or other identifiers associated with the users/clients that are scheduled to attend the meeting). This list of scheduled meeting information is merely illustrative and may vary depending on the capabilities of calendar service 520.

While only a single calendar service 520 is shown in the example of FIG. 5, in some cases meeting retrieval module 530 may receive meeting information from multiple different calendar services. The particular calendar service from which meeting retrieval module 530 receives meeting information can vary between different organizations and/or between different users of the same organization. To determine which calendar services to use for receiving meeting information, module 530 can obtain a list of applications and services used by a particular organization and/or user. For example, meeting retrieval module 530 may obtain a list of subscribed resources (e.g., applications and services) for a particular user/organization via resource feed service 420 of FIG. 4B

In some embodiments, meeting retrieval module 530 can receive scheduled meeting information from calendar service 520 on a continuous or periodic basis. For example, meeting retrieval module 530 can receive information about upcoming meetings that are scheduled to start within a given time period. For example, the time period can be defined as meetings that are scheduled to start within the next 3 hours, 6 hours, 12 hours, 24 hours, 2 days, 7 days, 30 days, etc. The time period can vary for different organizations and/or different users (e.g., it can be configured as an organizational policy or a user preference).

Meeting retrieval module 530 can store information about scheduled meetings within database 518. As an example, database 518 can be configured to store meeting information within a meetings table 536, which may correspond to a table within a relational database for example. For a particular meeting, meetings table 536 can store a tuple, or row, which includes the meeting identifier, the meeting's title, the date and/or time the meeting is scheduled to start, and a list of the meeting's attendees, among other values. In some embodiments, meeting retrieval module 530 may store received meeting information in memory. As previously discussed, various types of databases can be used in conjunction with the systems and methods sought to be protected herein and are not limited to use with relational databases.

Message retrieval module 532 is operable to receive information about one or more messages from collaboration services 522. For example, module 532 can retrieve information about messages using APIs provided by collaboration services 522, such as REST-based APIs or SaaS APIs provided thereby. The particular data collaboration services 522 from which message retrieval module 532 retrieves message information can vary between different organizations and/or between different users of the same organization. To determine which collaboration services 522 to use for receiving messages, module 532 can obtain a list of applications and services used by a particular organization and/or user. For example, message retrieval module 532 may obtain a list of subscribed resources (e.g., applications and services) for a particular user/organization via resource feed service 420 of FIG. 4B. Message retrieval module 532 may also obtain, for one or more users, authentication credentials (e.g., user ids and passwords, access tokens, etc.) needed to access one of more of the collaboration services 522. In some embodiments, message retrieval module 532 may use a single sign-on service (e.g., service 422 of FIG. 4B) to access one or more of the collaboration services 522.

A message is said to be associated with a particular collaboration application/service if the message was sent within, or received within, that collaboration application/service. A given message can include content, such as text and images, along with metadata such as a timestamp indicating when the message was sent/received, the identity of the user that sent the message ("the sender"), and the identities of one or more users that received the message ("the recipients"). Thus, for a particular message, message retrieval module 532 may receive the following information from a particular one of the collaboration services 522: (1) a value that unique identifies the message within the collaboration service from which the message was retrieved ("message identifier"), (2) the content of the message (e.g., in text format), (3) a timestamp of the message, (4) the sender, and a list of one or more recipients, whereby a sender or recipient can be identified by an email address or other identifier associated with the user/client that sent the message. This list of message information is merely illustrative and may vary depending on the capabilities of the particular collaboration services 522 being accessed.

Message retrieval module 532 can determine the sender and recipients of a message in various different ways depending on, for example, the type of message and/or which collaboration service 522 the message was retrieved from.

For example, certain collaboration service, such as SLACK and TEAMS, allow users to join groups (sometimes referred to as "teams" or "channels") and to send messages to all users belonging to the group. Thus, when receiving a message from such a collaboration service, message retrieval module 532 can determine if the message was sent to a group and, if so, can treat the users belonging to the group as the recipients of the message. Message retrieval module 532 can use an API provided by the collaboration application to determine the identity of users belong to particular groups. If one or more users are specifically named within a group message (e.g., using a notation such as "@userA" within the content of the message), then the specifically named users, rather than the whole group, may be treated as the recipients of the message.

As another example, some collaboration services, such as JIRA and WRIKE, allow for the creation of tasks (or "tickets") that can be assigned to a particular user. One or more users may be designated as "watchers" of a ticket such that when the ticket is created, or when the ticket is subsequently changed (e.g., a comment is added to the ticket), the watchers of the ticket are notified of the change. For the purpose of this disclosure, tickets, or changes thereto, may be treated as messages and the watchers of the ticket may be treated as the recipients of such a message. In some cases, a user assigned to a ticket may also be treated as a recipient of such a message. In some cases, a user that creates a ticket or makes a change to a ticket may be treated as the sender of such a message.

Message retrieval module 532 can receive messages that were sent/received within a given time period from one or more of the collaboration services 522. Such messages are referred to herein as "recent messages" and the corresponding time period is referred to herein as the "recent message window." For example, the recent message window can be defined as messages sent/received within the past 12 hours, 24 hours, 2 days, 3 days, 5 days, 7 days, 30 days, etc. The recent message window can vary for different organizations and/or different users (e.g., it can be configured as an organizational policy or a user preference). Message retrieval module 532 can query for recent messages using APIs provided by collaboration services 522 as a way to limit the amount of information processed by the various techniques described below. After receiving a message from collaboration services 522, message retrieval module 532 can scan, parse, or otherwise analyze the message to extract the content and metadata of the messages.

Message retrieval module 532 can store information about received messages within database 518. As an example, database 518 can be configured to store message information within a messages table 538, which may correspond to a table within a relational database for example. For a particular meeting, messages table 536 can store a tuple, or row, which includes the message identifier, an identifier of the collaboration service from which the message was retrieved ("collaboration service identifier"), the content of the message, a timestamp of the message, and the sender and recipients of the message. In some embodiments, message retrieval module 532 can store information about messages within a memory.

Message association module 534 is operable to associate messages received by message retrieval module 532 with scheduled meetings received by meeting retrieval module 530. In some embodiments, message association module 534 can use a three-step procedure for associating messages to meetings. The steps may be performed in an order different from than that described next.

In the first step, message association module 534 can identify a list of candidate messages from messages table 538. A candidate messages is a message that is potentially related to some scheduled meeting, according to a set of rules or decision criteria. In some embodiments, message association module 534 can determine that a message is a candidate message based on matching the content (e.g., text) of the message against a set of patterns. Message association module 534 may determine that a particular message is a candidate message if its content matches any of the patterns within the set.

As a few examples, one or more of the following patterns can be used to identify candidate messages:
1. *{message description}*{linking word}*{meeting date and description}
2. *{linking word}*{meeting date and description}*{message description} where * can match zero or more characters, {linking word} can match ones of a set of words that are commonly used to link, with the content of messages, descriptions of the messages to meetings. {message description} and {meeting date and description} can both match a free-form string or one or more sub-patterns. As an example, {linking word} can match the words "in" or "during." As another example, {meeting date and description} can include one or more of the following sub patterns:

A. {meeting date}*{meeting description}
B. {meeting description}*{meeting date} where {meeting date} can match ones of a set of phrases commonly used to describe when a meeting is scheduled to occur and {meeting description} can match a free-form string. As an example, {meeting date} can match phrases such as "tomorrow," "tomorrow's," "next week," "next week's," "the next," "Monday," "Monday's," "next Monday," etc. In some embodiments, a pattern or sub-pattern may be defined as a regular expression (or "regex").

The above illustrative patterns can be used to match a message such as "We will complete the PI12 Survey during the next review meeting." In this case, the phrase "We will complete the PI12 Survey" corresponds to the {message description}, the phrase "the next" corresponds to the {meeting time} and the phrase "review meeting" corresponds to the {meeting description}.

In some embodiments, message association module 534 can access the set of patterns to use from a configuration file, database, or other storage means. The set of patterns may vary for different organizations and/or different users (e.g., they can be configured as an organizational policy or a user preference). Moreover, the set of patterns used for an organization/user may adjusted over time to improve the accuracy of the associations between messages and meetings.

In some embodiments, message association module 534 can query messages table 538 to obtain the candidate messages. For example, module 534 can construct one or more queries based on the set of patterns and construct the list of candidate messages based on the results of the queries. In other embodiments, module 534 can retrieve all messages from message table 538—or all messages having a timestamp within a given time period (e.g., within a defined recent message window)—and then filter the retrieved messages to select messages that match one or more of the patterns to obtain the list of candidate messages.

In the second step, message association module 534 can identify, for ones of the candidate messages, one or more users that are associated with the message. That is, message association module 534 can determine which users should be reminded of a message prior to the start of a particular meeting and/or during the message if the message is determined to be associated with that particular meeting. In some embodiments, module 534 can determine that the users associated with a message include the sender and the recipients of the message. As previously discussed, message retrieval module 532 can determine the sender and recipients of a message in various different ways depending on, for example, the type of message and/or the type of collaboration service 522 from which the message was retrieved. In other embodiments, message association module 534 can determine that the users associated with a message include only the recipients of the message.

Message association module 534 can store information about which users are associated with which messages in database 518. For example, database 518 can be configured to store a user-message association table 539, which may correspond to a table within a relational database for example. For a particular user-message association, table 539 can store a tuple, or row, which includes an identifier that uniquely identifies the user ("user identifier"), a message identifier, and the corresponding collaboration service identifier. In some embodiments, module 534 can store information about which users are associated with which messages within a memory.

In the third step, message association module 534 can associate candidate messages to scheduled meetings based on testing for one or more conditions. In more detail, for a given candidate message and a given scheduled meeting, message association module 534 can determine that the message is associated with the meeting if all of the conditions are true, or if at least a threshold number of the conditions are true. In some embodiments, message association module 534 may use the following conditions to determine if a particular candidate message is associated with a particular scheduled meeting: (a) whether the {meeting date} matched within the message is the same as a date the meeting is scheduled for, (b) whether the {meeting description} matched within the message is the same as or similar to the title of the scheduled meeting, and (c) whether some or all of the users associated with the message are scheduled to attend the meeting. These conditions are merely examples and various other conditions could be used to determine whether a candidate message is associated with a scheduled meeting.

For condition (a), message association module 534 can compare the date a meeting is scheduled for against the {meeting date} matched within the content of a message om the first step. In some cases, the {meeting date} within a message may correspond to a relative date, such as "tomorrow" or "next Monday," whereas the date a meeting is schedule for may be an absolute date, such as Mar. 1, 2022. In this case, message association module 534 can calculate an absolute meeting date for the message based on a current date and the relative {meeting date}, and then compare the calculated absolute meeting date for the message to the absolute date the meeting is schedule for. In some cases, the {meeting date} within a message may correspond to a range of days. For example, if the {meeting date} is next "next week," the range of days can include Monday through Friday of the following week. In this case, module 534 can calculate a range of absolute dates for the message based on the current date and the range of days specified by {meeting date}. For example, if the current date is Mar. 1, 2022, and the message's {meeting date} is "next week," then message association module 534 can calculate the date range Mar. 7, 2022 to Mar. 11, 2022 for the message. Message association module 534 can then determine if the date the meeting is schedule for is included within the date range calculated for the message.

For condition (b), message association module 534 can compare the title of a scheduled meeting as determined by meeting retrieval module 530 to the {meeting description} matched within the content of a message from the first step. In some embodiments, message association module 534 may perform a string compassion to determine if the {meeting description} for the message is the same as, or similar to, the scheduled meeting's title. In some embodiments, message association module 534 may normalize these strings before comparing them. For example, message association module 534 may convert the strings to lowercase, remove leading and trailing whitespace from the strings, remove so-called "stop words" from the strings, etc. Stop words are commonly used words in a given language—like articles, prepositions, pronouns, conjunctions, etc.—that add relatively little information to the text in which they appear. In some embodiments, message association module 534 may utilize a list of stop words from a natural language processing (NLP) library/toolkit. In some embodiments, module 534 can use approximate string matching (or "fuzzy matching") to determine if the {meeting description} for a message is similar to a scheduled meeting's title. In some embodiments, message association module 534 may perform a substring search to determine if the message's {meeting description} is included within the meeting's title.

For condition (c), message association module 534 can compare the users scheduled to attend a meeting with the users associated with a candidate message in the second step. In some embodiments, if any user associated with the message is scheduled to attend the meeting, then then message association module 534 can determine that this condition is satisfied. In other embodiments, message association module 534 may require that all users associated with the candidate message are scheduled to attend the meeting for condition (c) to be satisfied.

As an example of applying these conditions, consider a candidate message having the content "@UserB please update the mock VDA testing status in tomorrow Standup meeting" where the message is sent by User A. Message association module 534 may determine that the message is associated with a particular scheduled meeting if (a) the meeting is scheduled for tomorrow, (b) the meeting title includes the word "Standup," and (c) both User A and User B are scheduled to attend the meeting. In some embodiments, message association module 534 may determine that the message is associated with a particular scheduled meeting if all of these conditions are satisfied. In other embodiments, message association module 534 may determine that the message is associated with a particular scheduled meeting if any of these conditions is satisfied. In other embodiments, message association module 534 may determine that the message is associated with a particular scheduled meeting if a threshold number of these conditions is satisfied (e.g., N or more conditions, where N can be configured for a particular organization or user). In some embodiments, N may be expressed as a percentage of total possible conditions that must be satisfied.

Message association module 534 can generate a set of associations between messages and meetings based on applying the one or more conditions. Module 534 can store information about such associations within database 518. As an example, database 518 can be configured to store such associations within a message-meeting associations table 540, which may correspond to a table within a relational database for example. For a particular message-meeting association, table 540 can store a tuple, or row, that includes the message's identifier, the corresponding collaboration service identifier, the meeting's identifier, and the {message description} matched within the content of a message from the first step.

Using the information stored within the association tables 539, 540, meeting message service 516 can generate aggregated lists of messages for particular meetings. For example, for a given meeting, meeting message service 516 can query the message-meeting associations table 540 for all rows associated with that meeting (e.g., by specifying the corresponding meeting identifier). The aggregated list of messages can then be formed using the corresponding {message description} values and possibly other values from the returned rows. An aggregated list of meeting messages is sometimes referred to herein as a "meeting TODO list."

In some cases, different users scheduled to attend the same meeting may have different messages they need to be reminded of before the meeting starts. For example, assume that User A receives a first message from User C, User B receives a different message from User C, and that both the first and second messages are associated with the same meeting by module 534. In this case, User A should be reminded of the first message but not the second and User B should be reminded of the second message but not the first. Thus, meeting message service 516 can generate meeting TODO lists that are personalized for individual users. In some embodiments, meeting message service 516 can execute a query against database 518 that join the user-message associations table 539 and the message-meeting associations table 540 together and selects rows that match a given user identifier and a given meeting identifier. The personalized meeting TODO list can then be formed using the corresponding {message description} values from the returned rows.

In some embodiments, meeting message service 516 can generate TODO lists in response to API requests received from clients and, more particularly, from instances of meeting message agent 510 running thereon. For example, in response to receiving an API request from client 502 that includes a user identifier and a meeting identifier, meeting message service 516 can generate a TODO list for that meeting, personalized for the user, and send the personalized meeting TODO list back to the client via an API response. As another example, in response to receiving an API request from a client that includes a user identifier (but not a meeting identifier), meeting message service 516 can generate personalized TODO lists for some or all of upcoming meetings the user is scheduled and send the personalized meeting TODO lists back to the client via an API response.

In some embodiments, meeting message service 516 may automatically push meeting TODO lists to one or more clients. For example, meeting message service 516 can query meetings table 536 for meetings that are scheduled to start within the next X minutes (e.g., X=15 minutes). That is, service 516 can query for meetings that are scheduled to start at a time less than or equal to a current time plus a defined time period ("reminder period"), where the reminder period can be expressed in minute (e.g., X minutes) and configured per-user and/or per-organization. For a given one of these meetings, meeting message service 516 can query the association tables 539, 540 to determine the users and messages associated with the meeting, generate one or more TODO lists based thereupon, and send (or "push") the TODO lists to clients of the associated users (e.g., via an API message). In some embodiments, meeting message service 516 can push a meeting TODO list to all scheduled attendees of the meeting.

In some embodiments, meeting message service 516 may allow clients to edit meeting TODO lists via one or more API requests. In more detail, meeting message service 516 may be configured to handle API requests that modify the association tables 539, 540, resulting in changes to meeting TODO lists generated therefrom. A few examples of API requests for editing TODO lists are described next.

To allow a particular message to be added or removed from a meeting TODO list, meeting message service 516 can receive an API request that includes the message's identifier, the corresponding collaboration service identifier, a meeting identifier, and an instruction to associate or dissociate the message with the meeting. In response to receiving such an API request, meeting message service 516 can add/remove a row to/from the message-meeting association table 540. This can have the effect of editing the TODO lists for all users associated with the message.

To allow a particular message to be added or removed from a personalized TODO list for an individual user, meeting message service 516 can receive an API request that includes the user's identifier, message's identifier, the corresponding collaboration service identifier, and an instruction to associate or dissociate the message with the user. In response to receiving such an API request, meeting message service 516 can add/remove a row to/from the user-message association table 539. This can have the effect of editing the personalized TODO lists the individual user.

To allow the description of a particular message to be modified a particular meeting TODO list, meeting message service 516 can receive an API request that includes the message's identifier, the corresponding collaboration service identifier, and an updated description (e.g., a string). In response to receiving such an API request, meeting message service 516 can update a row within the message-meeting association table 540 to replace the {message description} with the updated description. This can have the effect of editing the TODO lists for all users associated with the message.

Figure 6:
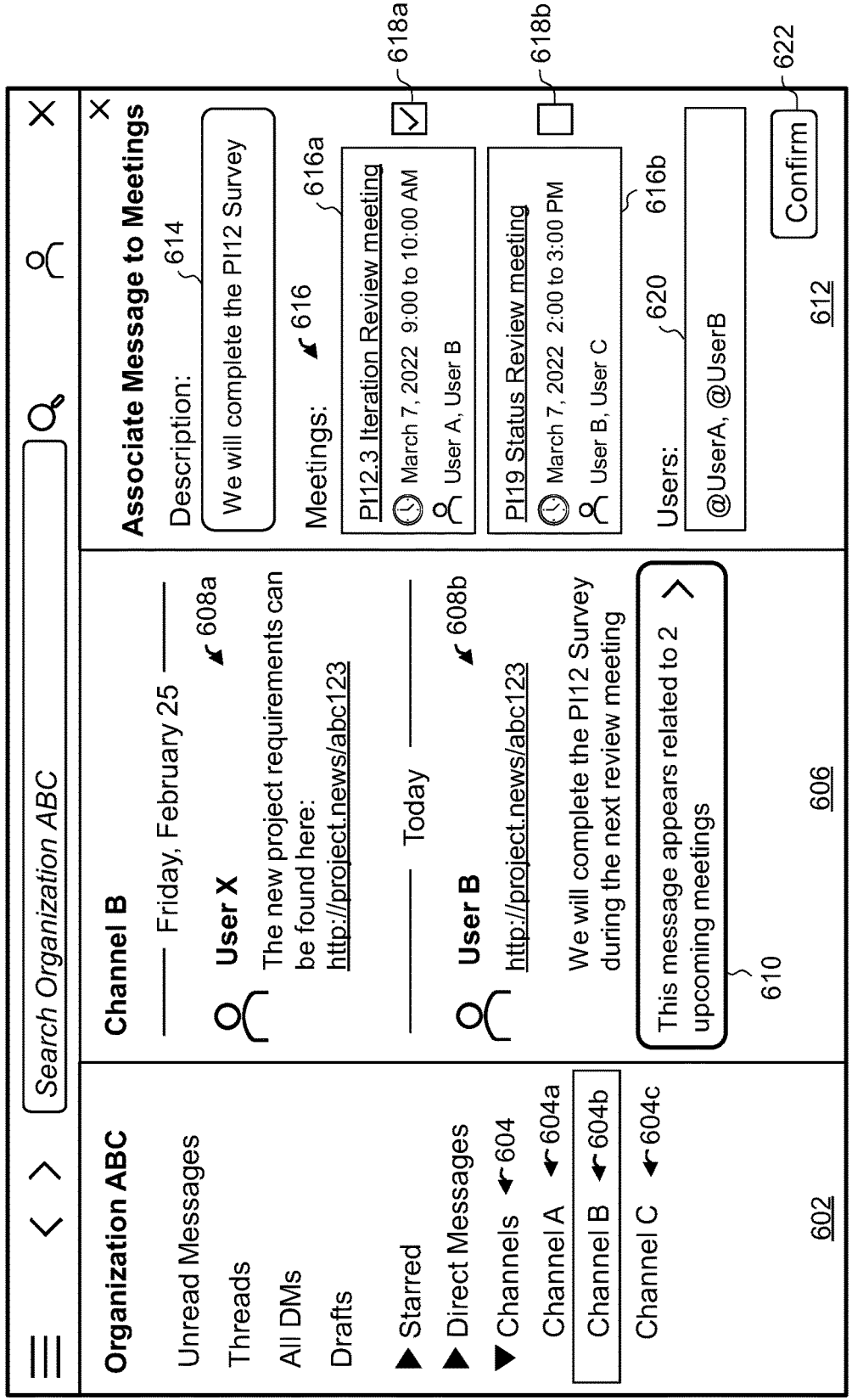
FIG. 6 is a pictorial diagram showing an illustrative user interface (UI) for editing associations between messages and meetings, according to some embodiments.
Figure 7:
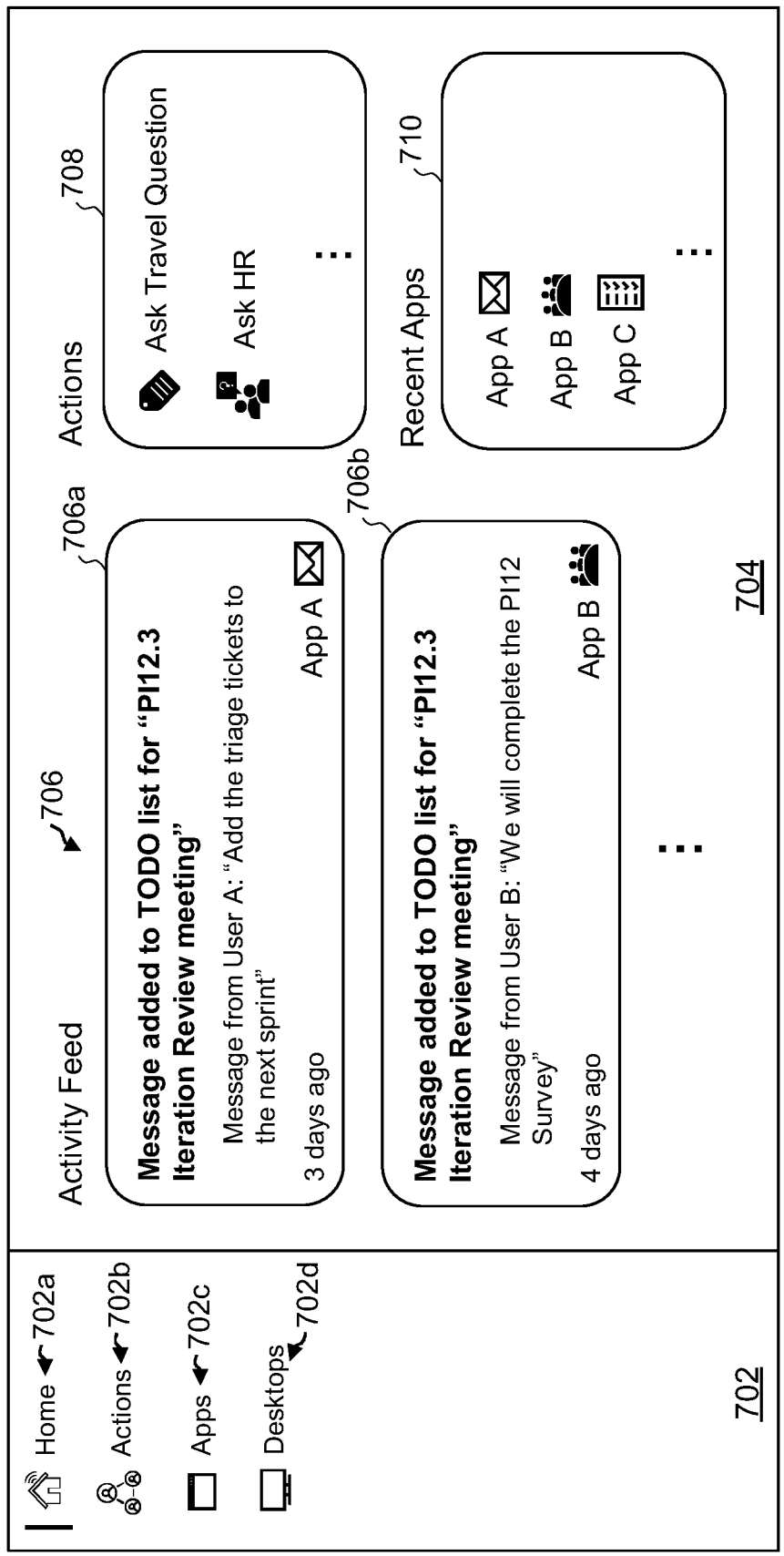
FIG. 7 is a pictorial diagram showing an illustrative UI for presenting notifications of associations between messages and meetings, according to some embodiments.

In some embodiments, in response to identifying a new message-meeting association, message association module 534 can send a notification (e.g., an API message) to clients of users associated with the message. In response, instances of meeting message agent 510 running on those clients can present one or more UIs for displaying the message-meeting association within a notification feed and/or for editing the message-meeting association. Examples of such UIs are shown in FIGS. 6 and 7 and described below in the context thereof.

In some embodiments, message association module 534 can require a sender of a message (i.e., a client associated with the sender) to confirm a message-meeting association before it the association is sent to other clients associated with other users. For example, message association module 534 may send a notification to the sender client via an API message. The sender client may present a UI for editing and/or confirming the message-meeting association. In response to a user input, the client may send an API message back to message association module 534 causing the association to be confirmed and, in response, module 534 may notify other clients of the message-meeting association and include the message within generated TODO lists for that meeting. To implement such a confirmation process, message-meeting association table 540 can include a confirmation field for particular rows, where the confirmation field defaults to false and is set to true in response to an API message received from the sender's client.

In some embodiments, message association module 534 can compute a matching score for particular message-meeting associations and store the computed matching scores within message-meeting association table 540. A matching score can indicate how closely the information within a message matches the information within a meeting. Various techniques can be used to compute a matching score. For example, the score can be computed based on a number of conditions (such as the conditions previously discussed) are satisfied for a given message-meeting pair. In the case where approximate string matching or another NLP technique is used to determine a message-meeting association, an NLP library/toolkit can be used to determine the score in terms of a confidence level for the approximate match.

In some embodiments, some or all of the processing described for meeting message service 516 can be implemented within client 502. For example, any or all of modules 530, 532, 534 may be implemented as sub-modules of meeting message agent 510 and configured to execute on client 502, rather than within cloud computing environment 504.

Turning back to client 502, meeting message agent 510 can includes various UI controls 524 for presenting TODO lists generated by meeting message service 516 and for accessing and editing particular message-meeting associations used to generate such meeting TODO lists. As previously discussed, meeting message agent 510 can be implemented as a plugin/extension to resource access application 508, calendar application 512, and/or one or more of collaboration applications 514. Thus, at least some of UI controls 524 may correspond to UI controls presented with one or more of applications 508, 512, 514. Examples of UI controls 524 that can be provided by meeting message agent 510 are shown and described below in the context of FIGS. 6-9.

In some embodiments, meeting message agent 510 can send API requests to meeting message service 516 at particular times to obtain message-meeting associations and/or meeting TODO lists that can be presented using UI controls 524. For example, meeting message agent 510 can interface with calendar application 512 to detect if a scheduled meeting is about to start (e.g., if the meeting is scheduled to start within a defined reminder period, such as the next X minutes) and, in response, can send an API request to meeting message service 516 to obtain a TODO list for the meeting and present the meeting TODO list as a reminder within calendar application 512.

As another example, in the case where a particular one of the collaboration applications 514 corresponds to an online meeting application (e.g., an application such as TEAMS or ZOOM), UI controls 524 presented within that application may include controls for accessing TODO lists for a meeting before the meeting starts and/or during the meeting. In response to a user input on such a UI control, meeting message agent 510 can send an API request to meeting message service 516 to obtain a TODO list for the meeting and present the meeting TODO list within the online meeting application.

As another example, meeting message agent 510 can detect when resource access application 508 launches or when a user input is received. In response, meeting message agent 510 can send an API request to meeting message service 516 to obtain information about messages associated with one or more meetings for which a user of client 502 is scheduled to attend and cause message-meeting association information to be displayed within an activity feed of resource access application 508.

As another example, and as previously discussed, meeting message agent 510 can receive meeting TODO lists and/or message-meeting association notifications that are pushed to client 502 by meeting message service 516.

Meeting message agent 510 can also send API requests to meeting message service 516 to edit/confirm meeting TODO lists in response to user inputs, as was also previously discussed.

Illustrative system 500 can automatically associate messages from within various different collaboration applications with an upcoming, scheduled meeting. System 500 can aggregate such messages into a TODO list and present the TODO list using one or more different UIs on client devices of users that are scheduled to attend the meeting. System 500 enables users to directly access to the meeting-associated messages within the collaboration applications without having, for example, manually login to each of those applications and search for the messages. System 500 can be used to reduce the duration of meetings, including online meetings, by providing users with relevant messages prior to the start of the meeting thus assistant users in preparing for the meeting in advance. As such, system 500 not only improves user productivity, but also reduces computer network and processor usage.

FIG. 6 shows an example of a UI 600 for editing—and in some cases confirming— associations between messages and meetings, according to some embodiments. UI 600 may be presented, for example, within a collaboration application running on a client, such as one of collaboration applications 514 running on client 502 of FIG. 5. In some cases, UI 600 may be presented within SLACK or TEAMS. Portions of UI 600 may be implemented within a meeting message agent that interfaces with the collaboration application to present the UI. For example, portions of UI 600 may correspond to UI controls 524 implemented within meeting message agent 510 of FIG. 5.

Illustrative UI 600 includes a navigation pane 602 having various navigation controls including a list of channels 604. The list of channels 604 can be expanded (e.g., in response to a click, tap, or other type of user input) to show one or more channels associated to which the client subscribes to or is otherwise associated with. In the example shown, the list of channels 604 includes a first channel 604a, a second channel 604b, and a third channel 604c. A particular one of the channels 604a, 604b, 604c can be selected in response to a user input thereon. In response to a selection of one of the channels 604a, 604b, 604c, UI 600 can update to show one or more messages associated with that channel within a message pane 606. In the example shown, the second channel ("Channel B") 604b is selected and the corresponding messages 608a, 608b are shown within message pane 606. The messages 608a, 608b may correspond to messages sent by a user of the client and/or messages sent by other users and received by the client (e.g., via a collaboration service 522 of FIG. 5). While only two messages 608a, 608b are shown, in general a channel can have an arbitrary number of messages associated therewith.

UI 600 can receive a notification when particular one of the messages 608a, 608a is automatically determined to be associated with one or more upcoming meetings that the client is scheduled to attend. For example, UI 600 can receive a notification from meeting message service 516 of FIG. 5 via an API message that includes various data generated and stored within association tables 539, 540. In response to the notification, UI 600 can display a notification control 610 that informs the user of the message-meeting association. The notification control 610 can be displayed proximate to the associated message. For example, as shown in FIG. 6, notification control 610 can be displayed below message 608*b* to indicate that message 608*b* has been automatically associated with an upcoming meeting. In response to a user input on notification control 610, UI can update to display details of the message-meeting association within an association editor pane 612.

Illustrative association editor pane 612 includes a description editor control (e.g., a text input) for displaying and editing the {message description} of the message-meeting association, a meetings list 616 for displaying and editing the meetings associated with the message, and a user editor control 620 (e.g., a text input) for displaying and editing the users associated with the message. In the example shown, meetings list 616 includes a first meeting 616*a* and a second meeting 616*b*, and user editor control 620 displays two users ("User A" and "User B"). Meetings list 616 can include checkboxes 616*a*, 618*b* located proximate to corresponding ones of the meetings 616*a*, 616*b*. In response a user input thereon, a particular one of the checkboxes 618*a*, 618*b* can be selected to associate the corresponding meeting with the message, or deselected to disassociate the corresponding meeting with the message. In the example of FIG. 6, first meeting 616*a* is associated with the message whereas second meeting 616*b* is not associated with the message.

As previously discussed, in some embodiments, message-meeting associations can include a matching score. In such embodiments, UI 600 can automatically select or deselect checkboxes 618*a*, 618*b* within the meetings list 616 based on corresponding matching scores. For example, if multiple meetings are automatically determined to be associated within a particular message, UI 600 can select the checkbox of the meeting with the highest matching score and deselect the checkboxes of the other meetings.

Association editor pane 612 can further include a confirm button 622. In response to a click, tap, or other type of user input thereon, UI 600 can cause one or more API requests to be sent to the meeting message service to edit/update/confirm the message-meeting association to reflect the state of the various controls 614, 616, 620. In turn, the meeting message service can update corresponding rows/records within a database used to generate personalized meeting TODO lists for the client. For example, meeting message service 516 of FIG. 4 can update rows within association tables 539, 540 in response to a user input on confirm button 622. In some embodiments, confirm button 622 may be labeled "Save" instead of "Confirm."

FIG. 7 shows an example of a UI for accessing for accessing messages associated with meetings, according to some embodiments. UI 700 may be presented, for example, within a resource access application running on a client, such resource access application 508 running on client 502 of FIG. 5. Portions of UI 700 may correspond to UI controls 524 implemented within meeting message agent 510 of FIG. 5.

Illustrative UI 700 includes a resource menu 702 and a content pane 704. Resource menu 702 can include, for example, a home menu item 702*a*, an actions menu item 702*b*, and a desktops menu item 702*d*. Menu items 702*a*-702*d* may also be referred to as "tabs." In response to a selection (e.g., a user input) of one of the menu items 702*a*-702*d*, UI 700 can cause corresponding content to appear in content pane 704. For example, as shown in FIG. 7, when a "Home" menu item 702*a* is selected, UI 700 can cause an activity feed 706, one or more actions 708, and one or more recent applications 710 to appear within content pane 704.

Activity feed 706 can display, among other activity, notifications that particular messages have been associated with particular scheduled meetings. The messages can include messages sent from, or received by, the client via one or more different collaboration applications. The scheduled meetings can include meetings that the client is scheduled to attend. In the example shown, activity feed 706 includes two such notification displays 706*a*, 706*b*. UI 700 can receive such notifications from a meeting message service (e.g., service 516 of FIG. 5) via one more API messages. A given one of the notification displays 706*a*, 706*b* can include the title of a meeting, the content of a message associated with the meeting, and a link to access the message within a corresponding collaboration application. In some embodiments, the notifications can be displayed chronologically within the activity feed 706.

Figure 8:
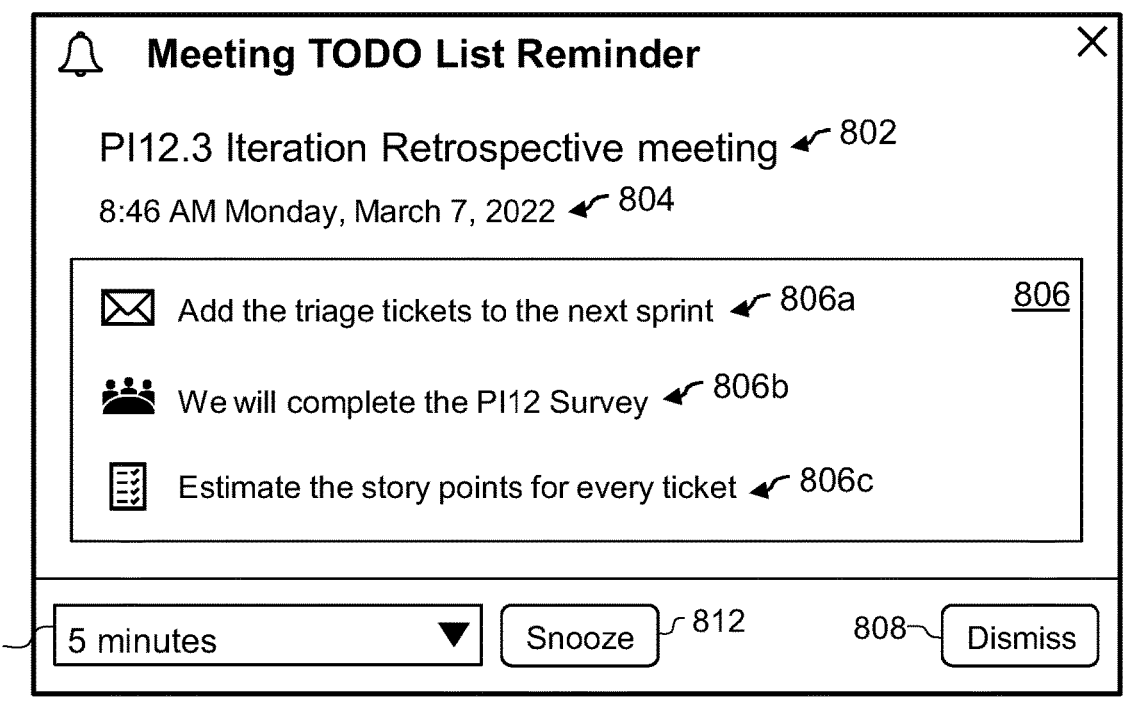
FIGS. 8 and 9 are pictorial diagrams showing examples of UIs for presenting an aggregated list of messages associated with a meeting, according to some embodiments.

FIG. 8 shows an example of a UI 800 for presenting aggregated meeting messages (i.e., a meeting TODO list), according to some embodiments. UI 800 may be presented, for example, within a calendar application running on a client, such as calendar application 512 running on client 502 of FIG. 5. In some embodiments, UI 800 may be presented as a popup window of the calendar application (e.g., OUTLOOK). Portions of UI 800 may be implemented within a meeting message agent that interfaces with the calendar application to present the UI. For example, portions of UI 800 may correspond to UI controls 524 implemented within meeting message agent 510 of FIG. 5.

UI 800 may be automatically presented on the client prior to the start of a meeting that the client is scheduled to attend. For example, UI 800 may be presented X minutes before the start of a meeting, where X can be equal to 5, 10, 15, 30, etc. In this way, UI 800 can serve as a timely reminder of messages that the attendee of the meeting needs to review prior to the meeting and/or be prepared to address during the meeting. In some embodiments, the meeting message agent running on the client may keep track of upcoming scheduled meetings and may cause UI 800 to be presented X minutes before a meeting starts. In some embodiments, the meeting message agent may send an API request to a meeting message service (e.g., service 516 of FIG. 5) to obtain a TODO list for a meeting and may use the returned meeting TODO list data to populate UI 800. In other embodiments, the meeting message service may push the meeting TODO list to the client prior to the start of the meeting.

Illustrative UI 800 can include a first text control 802 for displaying the title of a meeting, a second text control 804 for displaying the date and/or time the meeting is scheduled to start, a message pane 806 for displaying one or more messages associated with the meeting, and a button 808 to dismiss the UI 800 (i.e., to cause the popup window in which UI 800 is presented to be closed). Message pane 806 can include message displays 806*a*, 806*b*, 806*c* for the one or more messages on the meeting TODO list. A given one of the message displays 806*a*, 806*b*, 806*c* can include the corresponding {message description} and an icon representing the collaboration application within which the message was sent or received. In response to a click, tap, or other type of user input on a given one of the message displays 806*a*, 806*b*, 806*c*, UI 800 can cause the message to be accessed within the corresponding collaboration application. For example, UI 800 can cause the collaboration application to be opened in a separate window and for the message to be displayed therein. As another example, UI 800 can cause a redirect to the collaboration application.

Illustrative UI 800 can further include one or more controls for temporarily dismissing itself and for causing it to reappear at a future time. That is, UI 800 can include one or more controls for "snoozing" the meeting TODO list reminder. In the example of FIG. 8, UI 800 includes a dropdown list 810 to select a time period and a snooze button 812. In response to a user input on snooze button 812, UI 800 can dismiss itself and cause it to reappear at a future time specified by the selected time period. In some embodiments, in response to such a user input, UI 800 may cause a timer to be set (e.g., within the meeting assistant agent) and, in response to expiration of said timer, can cause UI 800 to reappear.

Figure 9:
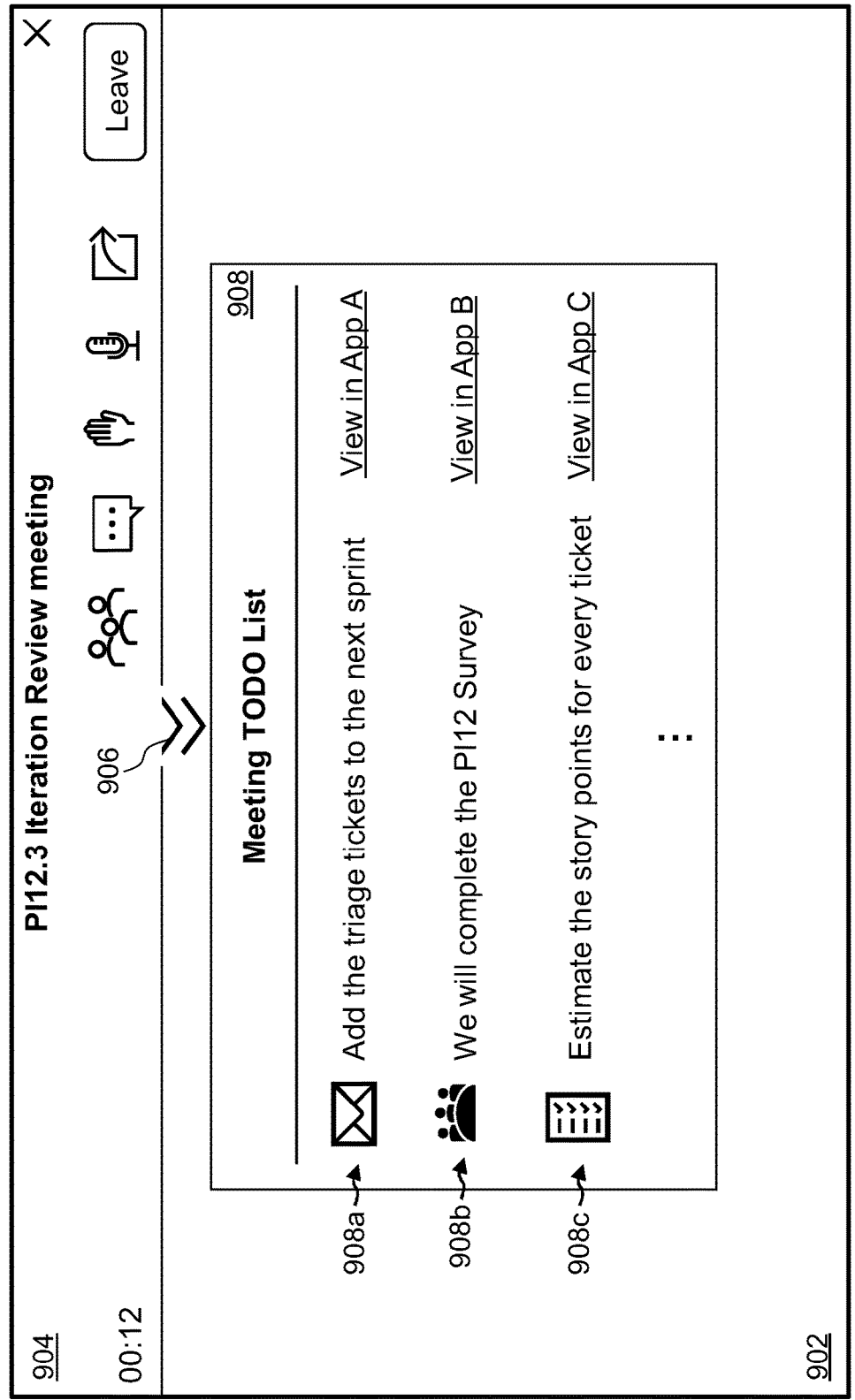

FIG. 9 shows another example of a UI 900 for presenting aggregated meeting messages, according to some embodiments. UI 900 may be presented, for example, within a collaboration application running on a client, such as one of the collaboration applications 512 running on client 502 of FIG. 5. More particularly, UI 900 may be presented within an online meeting application such as TEAMS or ZOOM. Portions of UI 900 may be implemented within a meeting message agent that interfaces with the online meeting application to present the UI. For example, portions of UI 900 may correspond to UI controls 524 implemented within meeting message agent 510 of FIG. 5.

Illustrative UI 900 includes a content pane 902 and a control pane 904 (or "header"). Content pane 902 can display content of an online meeting, such as video of one or more meeting participants or images of a screen, window, or document that is shared by one of the meeting participants. Control pane 904 can include various controls for controlling participation in an online meeting, such as controls for leaving the meeting, muting a microphone, sending chat messages to participants, etc. Control pane 904 can also include a control for accessing a TODO list for the meeting generated according to embodiments of the disclosure. For example, as shown, control pane 904 can include a swipe/drag down control 906 that, in response to a user input, causes a meeting TODO list window 908 to appear within the UI 900. The meeting TODO list window 908 can include one or more message displays 908*a*, 908*b*, 908*c*, whereby a given one of the message displays 908*a*, 908*b*, 908*c* can include an icon representing the collaboration application within which a corresponding message was sent or received, the {message description} for the message, and a link to access the message within the collaboration application. While only three message displays 908*a*, 908*b*, 908*c* are shown in the example of FIG. 9, in general meeting TODO list window 908 can include display an arbitrary number of messages. In some embodiments, meeting TODO list window 908 can be automatically presented when the client joins a meeting. Thus, UI 900 provides a convenient means for a participant of an online meeting to access a list of messages that were automatically associated with the meeting.

FIGS. 10-15 flow diagrams showing illustrative processes for aggregating and presenting messages associated with meetings, according to embodiments of the present disclosure. The various processes can be implemented within and/or performed by system 500 of FIG. 5.

Figure 10:
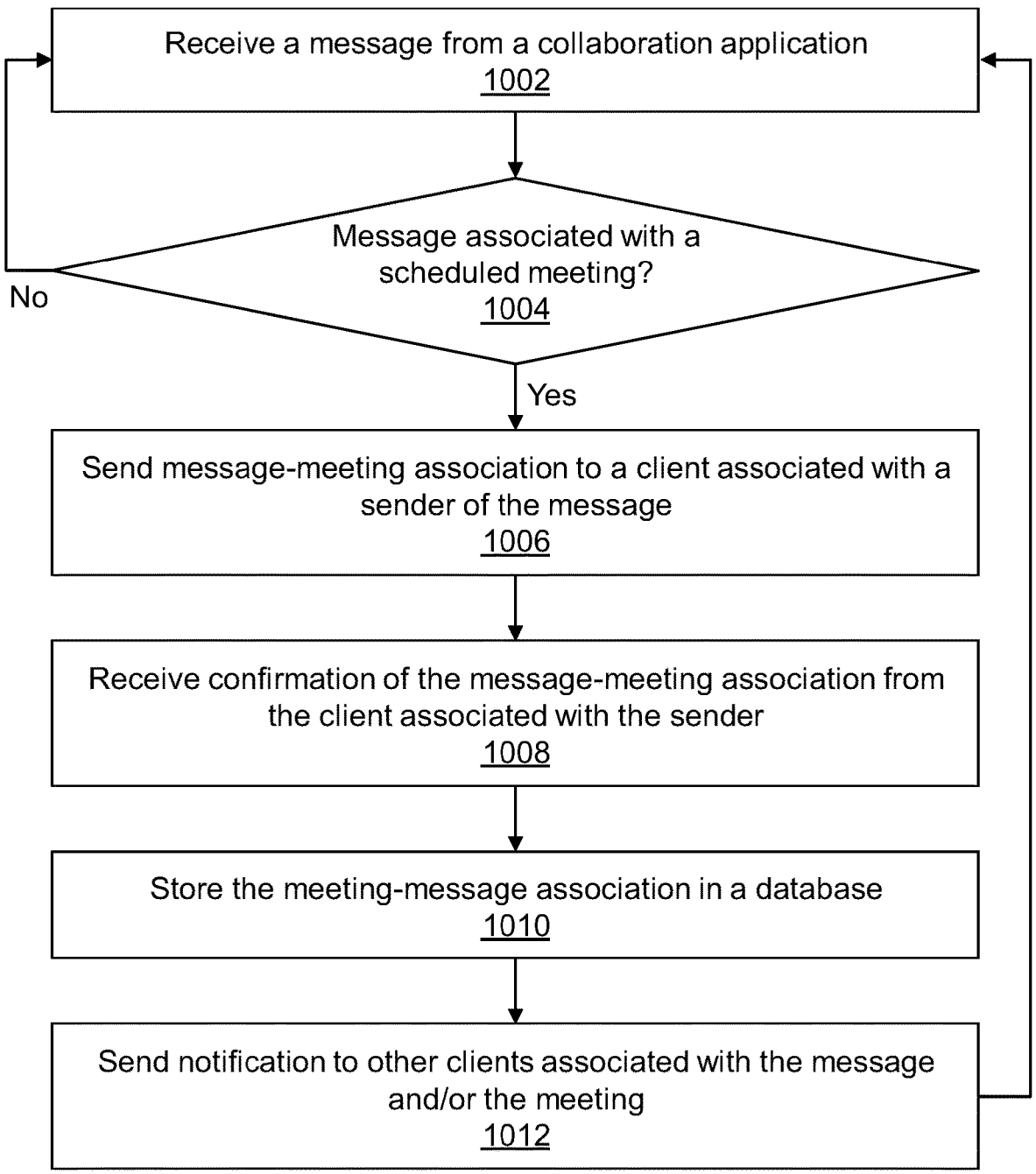
FIGS. 10-15 flow diagrams showing illustrative processes for aggregating and presenting messages associated with meetings, according to embodiments of the present disclosure.

Turning to FIG. 10, an illustrative process 1000 can be implemented, for example, within meeting message service 516 of FIG. 5. At block 1002, a message can be received from a collaboration application. At block 1004, a determination can be made of whether the message is associated with a scheduled meeting (e.g., from among a set of upcoming scheduled meetings). Any of the techniques described above for associating messages to meetings can be used. If the message is determined to be associated with a scheduled meeting, then, at block 1006, a notification of the message-meeting association can be sent to a client associated with a sender of the message. In response, the sender's client can display a UI for editing/confirming the message-meeting association. At block 1008, a confirmation of the message-meeting association can be received from the sender's client. In response to receiving the confirmation, at block 1010, the association can be stored in a database or, in some embodiments, an existing record of the association can be updated within the database (e.g., to change a confirmation field thereof from false to true). At block 1012, a notification of the message-meeting association can be sent to clients of other users associated with the message, associated with the meeting, or associated with both the message and the meeting. Techniques for identifying such other users are described above in the context of FIG. 5.

Figure 11:
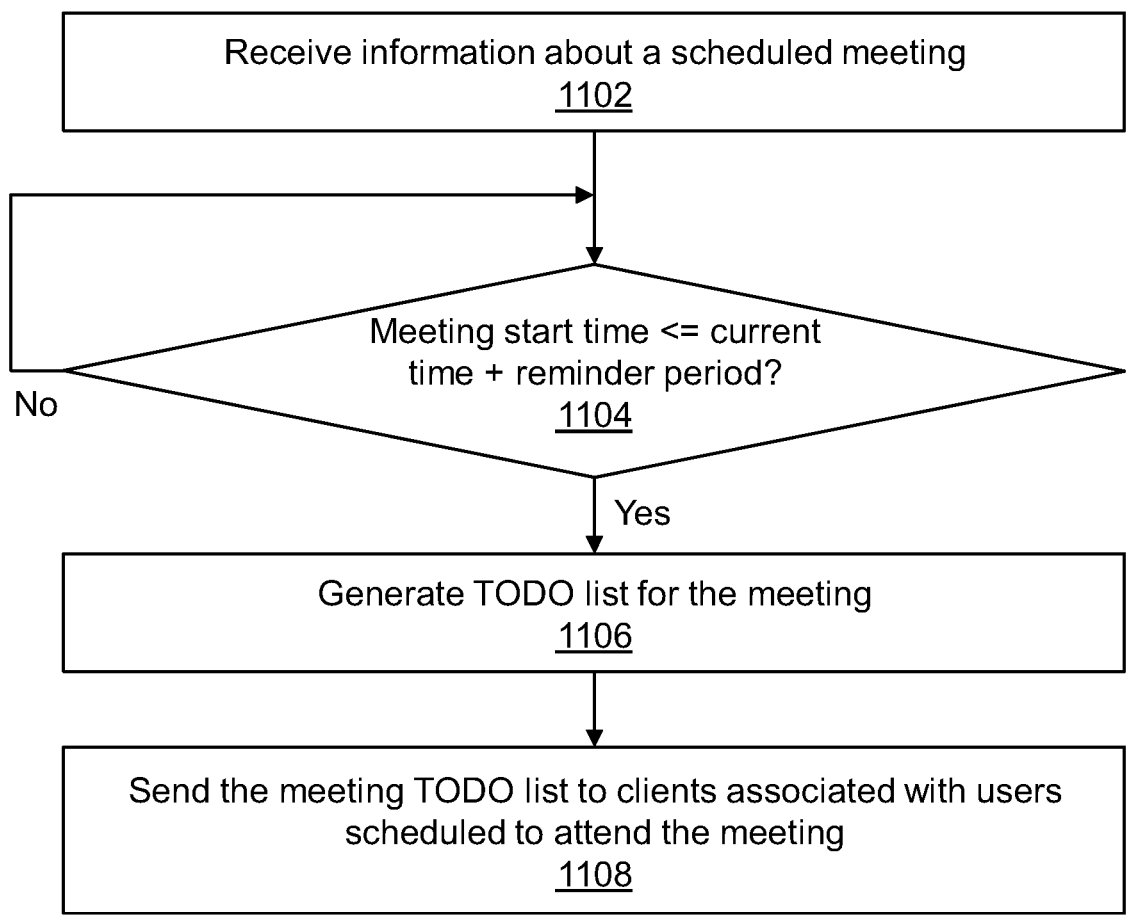

FIG. 11 shows an illustrative process 1100 can be implemented, for example, within meeting message service 516 of FIG. 5. At block 1102, information about a scheduled meeting can be received. For example, the information can be received from a calendar service (e.g., calendar service 520 of FIG. 5) or from a database (e.g., by querying meetings table 536 within database 518 of FIG. 5). At block 1104, a determination of can be made of whether the meeting's start time is less than or equal to a current time plus a defined reminder period (e.g., whether the meeting is scheduled to start within the next X minutes). If so, then process 1100 can continue to block 1106, otherwise process 1100 can repeat at block 1104. At block 1106, a TODO list can be generated for the meeting using, for example, information stored within association tables 539, 540 of FIG. 5. At block 1108, the meeting TODO list can be sent to one or more clients associated with users scheduled to attend the meeting. The clients can be configured to present the meeting TODO list using any of the UIs disclosed herein.

Figure 12:
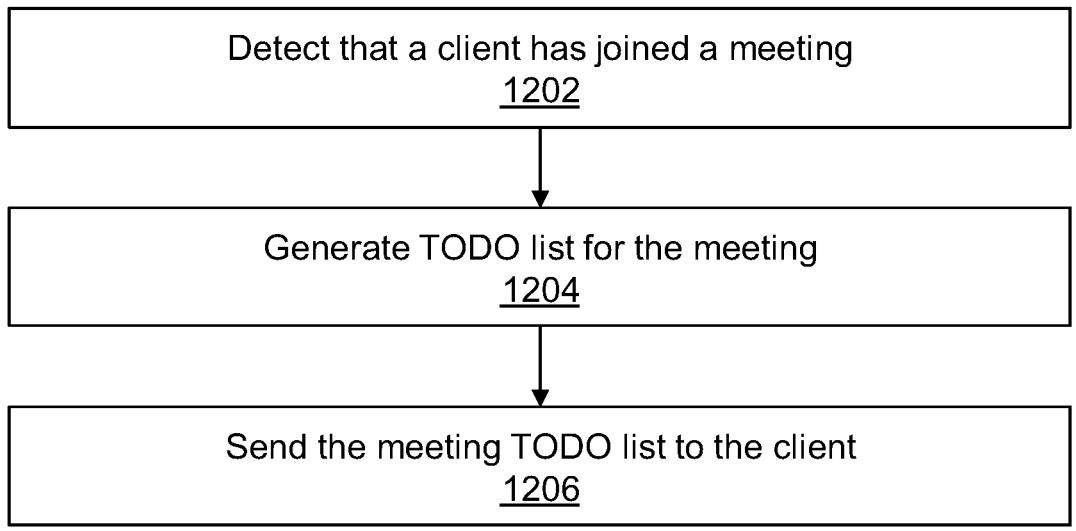

FIG. 12 shows an illustrative process 1200 can be implemented, for example, within meeting message service 516 of FIG. 5. At block 1202, it can be detected that a client has joined a meeting (e.g., by receiving a notification from one of the collaboration services 522 of FIG. 5 that corresponds to an online meeting service). At block 1204, a TODO list can be generated for the meeting. At block 1206, the meeting TODO list can be sent to the client. The client can be configured to present the meeting TODO list using any of the UIs disclosed herein.

Figure 13:
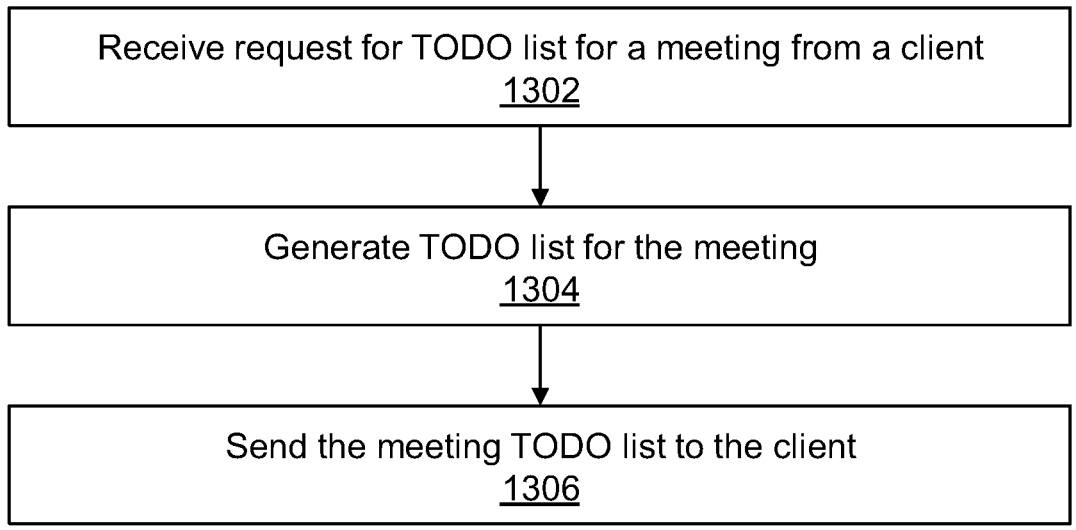

FIG. 13 shows an illustrative process 1300 can be implemented, for example, within meeting message service 516 of FIG. 5. At block 1302, a request for a meeting TODO list can be received from a client (e.g., in response to the client detecting that the meeting joined an online meeting). At block 1304, a TODO list can be generated for the meeting. At block 1306, the meeting TODO list can be sent to the client. The client can be configured to present the meeting TODO list using any of the UIs disclosed herein.

Figure 14:
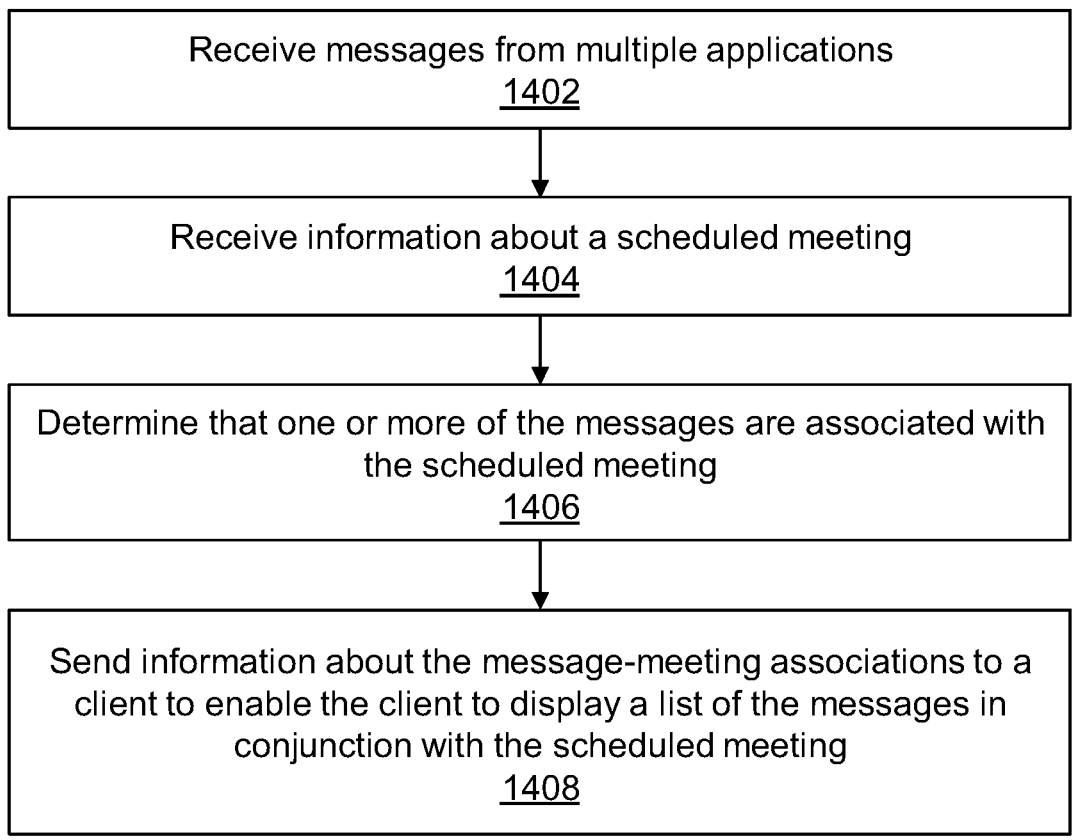

FIG. 14 shows an illustrative process 1400 can be implemented, for example, within meeting message service 516 of FIG. 5. At block 1402, messages can be received from multiple different applications (e.g., from two or more of collaboration services 522 of FIG. 5). At block 1404, information about a scheduled meeting can be received, e.g., from calendar service 520 of FIG. 5 or from database 518 of FIG. 5. At block 1406, it can be determined that one or more of the messages are associated with the scheduled meeting. Any of the techniques disclosed herein for association messages to meetings can be used. At block 1408, information about the message-meeting associations can be sent to a client to enable the client to display a list of the messages in conjunction with the scheduled meeting.

Figure 15:

FIG. 15 shows an illustrative process 1500 can be implemented, for example, within meeting message agent 510 of FIG. 5. At block 1502, information about associations between a plurality of messages and a meeting can be received. At least two different messages may be associated with two different applications (e.g., two different ones of collaboration applications 514 of FIG. 5). At block 1504, a UI for displaying a list of the messages in conjunction with the meeting can be presented. For example, UI 800 of FIG. 8 and/or UI 900 of FIG. 9 may be presented to display the list of messages in conjunction with the meeting.

The following examples pertain to further embodiments, from which numerous permutations and configurations will be apparent.

Example 1 includes a method including: receiving, by a computing device, a plurality of messages, where at least a first one of the plurality of messages is associated with a first application and at least a second one of the plurality of messages is associated with a second application different from the first; receiving, by the computing device, information about one or more scheduled meetings; determining, by the computing device, one or more of the plurality of messages that are associated with a first meeting of the one or more scheduled meetings; and sending, by the computing device, information about the associations of the one or more of the plurality of messages and the first meeting to another computing device to enable the another computing device to display a list of the one or more of the plurality of messages in conjunction with the first meeting.

Example 2 includes the subject matter of Example 1, wherein the determination that the one or more of the plurality of messages are associated with the first meeting includes: identifying a list of candidate messages by matching ones of the plurality of messages against a set of patterns; and for ones of the candidate messages: identifying one or more users associated with the candidate message, comparing the one or more users associated with the candidate message to a set of users scheduled to attend the first meeting, and comparing content of the candidate message against a description of the first meeting.

Example 3 includes the subject matter of Example 1 or 2, and further includes: responsive to a determination that a first message of the one or more of the plurality of messages is associated with the first meeting, storing information about the association of the first message and the first meeting to a database; and responsive to a determination that a second message of the one or more of the plurality of messages is associated with the first meeting, storing information about the association of the second message and the first meeting to the database, wherein sending the information about the associations of the one or more of the plurality of messages and the first meeting includes querying the database for stored information about associations with the first meeting.

Example 4 includes the subject matter of any of Examples 1 to 3, and further includes: responsive to the determination that the first message of the one or more of the plurality of messages is associated with the first meeting: sending information about the association of the first message and the first meeting to the another computing device to enable the another computing device to edit the association of the first message and the first meeting.

Example 5 includes the subject matter of 4, and further includes: receiving updated information about the association of the first message and the first meeting from the another computing device; and storing the updated information about the association of the first message and the first meeting to the database.

Example 6 includes the subject matter of any of Examples 1 to 5, wherein the another computing device is one of a plurality of other computing devices associated with users that are scheduled to attend the first meeting, wherein sending the information about the associations of the one or more of the plurality of messages and the first meeting to the another computing device includes sending the information about the associations of the one or more of the plurality of messages to the plurality of other computing devices.

Example 7 includes the subject matter of any of Examples 1 to 6, wherein the another computing device is one of a plurality of other computing devices associated with users that are scheduled to attend the first meeting, the method further comprising: determining, by the computing device, one or more other ones of the plurality of messages that are associated with the first meeting and with a first user associated with a first one of the plurality of other computing devices, the one or more other ones of the plurality of messages being different from the ones of the plurality of messages; and sending, by the computing device, information about the associations of the one or more other ones of the plurality of messages and the first meeting to the first one of the plurality of other computing devices to enable the first one of the plurality of other computing devices to display a list of the one or more other ones of the plurality of messages in conjunction with the first meeting.

Example 8 includes a method including: receiving, by a computing device, information about associations between a plurality of messages and a meeting, wherein at least a first one of the plurality of messages is associated with a first application and at least a second one of the plurality of messages is associated with a second application; and presenting, by the computing device, a user interface (UI) for displaying a list of the plurality of messages in conjunction with the meeting.

Example 9 includes the subject matter of Example 8, and further includes: detecting, by the computing device, that the meeting is scheduled to start at a time less than or equal to a current time plus a reminder period, wherein the UI is presented within a calendar application responsive to the detection.

Example 10 includes the subject matter of Example 8 or 9, and further includes: detecting that the computing device has joined the meeting, wherein UI is presented within an application for accessing the meeting responsive to the detection.

Example 11 includes the subject matter of any of Examples 8 to 10, and further includes: receiving, by the computing device, information about an association between a first one of the plurality of messages and the meeting; and presenting, by the computing device, a UI for editing the association between a first one of the plurality of messages and the meeting.

Example 12 includes the subject matter of Example 11, wherein the UI for editing the association between a first one of the plurality of messages and the meeting includes controls for editing a description of the first one of the plurality of messages and for editing a list of users associated with both the first one of the plurality of messages and the meeting.

Example 13 includes the subject matter of any of Examples 8 to 12, and further includes: displaying, by the computing device, the information about an association between a first one of the plurality of messages and the meeting within an activity feed.

Example 14 includes a computing device including: a processor; and a memory storing computer program code that when executed on the processor causes the processor to execute a process comprising: receiving a plurality of messages, where at least a first one of the plurality of messages is received from a first application and at least a second one of the plurality of messages is received from a second application; receiving information about one or more scheduled meetings; determining one or more of the plurality of messages that are associated with a first meeting of the one or more scheduled meetings; and sending information about the associations of the one or more of the plurality of messages and the first meeting to another computing device to enable the another computing device to display a list of the one or more of the plurality of messages in conjunction with the first meeting.

Example 15 includes the subject matter of Example 14, wherein the determination that the one or more of the plurality of messages are associated with the first meeting includes: identifying a list of candidate messages by matching ones of the plurality of messages against a set of patterns; and for ones of the candidate messages: identifying one or more users associated with the candidate message, comparing the one or more users associated with the candidate message to a set of users scheduled to attend the first meeting, and comparing content of the candidate message against a description of the first meeting.

Example 16 includes the subject matter of Example 14 or 15, wherein the process further comprises: responsive to a determination that a first message of the one or more of the plurality of messages is associated with the first meeting, storing information about the association of the first message and the first meeting to a database; and responsive to a determination that a second message of the one or more of the plurality of messages is associated with the first meeting, storing information about the association of the second message and the first meeting to the database, wherein sending the information about the associations of the one or more of the plurality of messages and the first meeting includes querying the database for stored information about associations with the first meeting.

Example 17 includes the subject matter of Example 16, wherein the process further comprises, responsive to the determination that the first message of the one or more of the plurality of messages is associated with the first meeting: sending information about the association of the first message and the first meeting to the another computing device to enable the another computing device to edit the association of the first message and the first meeting.

Example 18 includes the subject matter of Example 17, wherein the process further comprises: receiving updated information about the association of the first message and the first meeting from the another computing device; and storing the updated information about the association of the first message and the first meeting to the database.

Example 19 includes the subject matter of any of Examples 14 to 18, wherein the another computing device is one of a plurality of other computing devices associated with users that are scheduled to attend the first meeting, wherein sending the information about the associations of the one or more of the plurality of messages and the first meeting to the another computing device includes sending the information about the associations of the one or more of the plurality of messages to the plurality of other computing devices.

Example 20 includes the subject matter of Example 14 or 19, wherein the another computing device is one of a plurality of other computing devices associated with users that are scheduled to attend the first meeting, the process further comprising: determining one or more other ones of the plurality of messages that are associated with the first meeting and with a first user associated with a first one of the plurality of other computing devices, the one or more other ones of the plurality of messages being different from the ones of the plurality of messages; and sending information about the associations of the one or more other ones of the plurality of messages and the first meeting to the first one of the plurality of other computing devices to enable the first one of the plurality of other computing devices to display a list of the one or more other ones of the plurality of messages in conjunction with the first meeting As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory and/or in a discrete electronic circuit, which can be analog or digital. A processor or controller can contain internal processors or modules that perform portions of the function, operation, or sequence of operations. Similarly, a module can contain internal processors or internal modules that perform portions of the function, operation, or sequence of operations of the module.

The subject matter described herein can be implemented in digital electronic circuitry, or in computer software, firmware, or hardware, including the structural means disclosed herein and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this disclosure, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the disclosure to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A method comprising:
receiving, by a computing device, a plurality of messages, where at least a first one of the plurality of messages is associated with a first application and at least a second one of the plurality of messages is associated with a second application different from the first;
receiving, by the computing device, information about one or more scheduled meetings;
determining, by the computing device, one or more of the plurality of messages that are associated with a first meeting of the one or more scheduled meetings;
sending, by the computing device, information about the associations of the one or more of the plurality of messages and the first meeting to another computing device to enable the another computing device to display a list of the one or more of the plurality of messages in conjunction with the first meeting;
responsive to a determination that a first message of the one or more of the plurality of messages is associated with the first meeting, storing information about the association of the first message and the first meeting to a database;
responsive to a determination that a second message of the one or more of the plurality of messages is associated with the first meeting, storing information about the association of the second message and the first meeting to the database;
responsive to the determination that the first message of the one or more of the plurality of messages is associated with the first meeting, sending information about the association of the first message and the first meeting to the another computing device to enable the another computing device to edit the association of the first message and the first meeting;
receiving updated information about the association of the first message and the first meeting from the another computing device; and
storing the updated information about the association of the first message and the first meeting to the database, wherein sending the information about the associations of the one or more of the plurality of messages and the first meeting includes querying the database for stored information about associations with the first meeting.

2. The method of claim 1, wherein the determination that the one or more of the plurality of messages are associated with the first meeting includes:
identifying a list of candidate messages by matching ones of the plurality of messages against a set of patterns; and
for ones of the candidate messages:
identifying one or more users associated with the candidate message,
comparing the one or more users associated with the candidate message to a set of users scheduled to attend the first meeting, and
comparing content of the candidate message against a description of the first meeting.

3. The method of claim 1, wherein the another computing device is one of a plurality of other computing devices associated with users that are scheduled to attend the first meeting, wherein sending the information about the associations of the one or more of the plurality of messages and the first meeting to the another computing device includes sending the information about the associations of the one or more of the plurality of messages to the plurality of other computing devices.

4. The method of claim 1, wherein the another computing device is one of a plurality of other computing devices associated with users that are scheduled to attend the first meeting, the method further comprising:
determining, by the computing device, one or more other ones of the plurality of messages that are associated with the first meeting and with a first user associated with a first one of the plurality of other computing devices, the one or more other ones of the plurality of messages being different from the ones of the plurality of messages; and
sending, by the computing device, information about the associations of the one or more other ones of the plurality of messages and the first meeting to the first one of the plurality of other computing devices to enable the first one of the plurality of other computing devices to display a list of the one or more other ones of the plurality of messages in conjunction with the first meeting.

5. A method comprising:
receiving, by a computing device, information about associations between a plurality of messages and a meeting, wherein at least a first one of the plurality of messages is associated with a first application and at least a second one of the plurality of messages is associated with a second application;
presenting, by the computing device, a user interface (UI) for displaying a list of the plurality of messages in conjunction with the meeting;
receiving, by the computing device, information about an association between a first one of the plurality of messages and the meeting;
presenting, by the computing device, a UI for editing the association between a first one of the plurality of messages and the meeting;
updating, by the computing device, the information about the association between the first one of the plurality of messages and the meeting; and
sending, by the computing device, updated information about the association between the first one of the plurality of messages and the meeting to another computing device,
wherein the UI for editing the association between a first one of the plurality of messages and the meeting includes controls for editing a description of the first one of the plurality of messages and for editing a list of users associated with both the first one of the plurality of messages and the meeting.

6. The method of claim 5, further comprising:
detecting, by the computing device, that the meeting is scheduled to start at a time less than or equal to a current time plus a reminder period,
wherein the UI is presented within a calendar application responsive to the detection.

7. The method of claim 5, further comprising:
detecting that the computing device has joined the meeting,
wherein UI is presented within an application for accessing the meeting responsive to the detection.

8. The method of claim 5, further comprising:
displaying, by the computing device, the information about an association between a first one of the plurality of messages and the meeting within an activity feed.

9. A computing device comprising:
a processor; and
a memory storing computer program code that when executed on the processor causes the processor to execute a process comprising:
receiving a plurality of messages, where at least a first one of the plurality of messages is received from a first application and at least a second one of the plurality of messages is received from a second application;
receiving information about one or more scheduled meetings;
determining one or more of the plurality of messages that are associated with a first meeting of the one or more scheduled meetings;
sending information about the associations of the one or more of the plurality of messages and the first meeting to another computing device to enable the another computing device to display a list of the one or more of the plurality of messages in conjunction with the first meeting;
responsive to a determination that a first message of the one or more of the plurality of messages is associated with the first meeting, storing information about the association of the first message and the first meeting to a database;
responsive to a determination that a second message of the one or more of the plurality of messages is associated with the first meeting, storing information about the association of the second message and the first meeting to the database;
responsive to the determination that the first message of the one or more of the plurality of messages is associated with the first meeting, sending information about the association of the first message and the first meeting to the another computing device enabling the another computing device to edit the association of the first message and the first meeting;
receiving updated information about the edited association of the first message and the first meeting from the another computing device; and
storing the updated information about the edited association of the first message and the first meeting to the database,
wherein sending the information about the associations of the one or more of the plurality of messages and the first meeting includes querying the database for stored information about associations with the first meeting.

10. The computing device of claim 9, wherein the determination that the one or more of the plurality of messages are associated with the first meeting includes:
identifying a list of candidate messages by matching ones of the plurality of messages against a set of patterns; and
for ones of the candidate messages:
identifying one or more users associated with the candidate message,
comparing the one or more users associated with the candidate message to a set of users scheduled to attend the first meeting, and
comparing content of the candidate message against a description of the first meeting.

11. The computing device of claim 9, wherein the another computing device is one of a plurality of other computing devices associated with users that are scheduled to attend the first meeting, wherein sending the information about the associations of the one or more of the plurality of messages and the first meeting to the another computing device includes sending the information about the associations of the one or more of the plurality of messages to the plurality of other computing devices.

12. The computing device of claim 9, wherein the another computing device is one of a plurality of other computing devices associated with users that are scheduled to attend the first meeting, the process further comprising:
- determining one or more other ones of the plurality of messages that are associated with the first meeting and with a first user associated with a first one of the plurality of other computing devices, the one or more other ones of the plurality of messages being different from the ones of the plurality of messages; and
- sending information about the associations of the one or more other ones of the plurality of messages and the first meeting to the first one of the plurality of other computing devices to enable the first one of the plurality of other computing devices to display a list of the one or more other ones of the plurality of messages in conjunction with the first meeting.

* * * * *